United States Patent [19]
Tagawa et al.

[11] Patent Number: 5,491,706
[45] Date of Patent: Feb. 13, 1996

[54] DISPLAY-INTEGRATED TYPE TABLET DEVICE CAPABLE OF DETECTING CORRECT COORDINATES AT A TIP END OF A DETECTION PEN BY DETECTING EXTERNAL NOISE

[75] Inventors: Takao Tagawa, Kashihara; Hitoshi Nohno, Osaka; Kiyohiro Nozaki, Yao; Kazunari Okamura, Kitakatsuragi, all of Japan

[73] Assignee: Sharp Kabushiki Kaisha, Osaka, Japan

[21] Appl. No.: 222,907

[22] Filed: Apr. 5, 1994

[30] Foreign Application Priority Data

Apr. 7, 1993 [JP] Japan ................................. 5-080473
Apr. 13, 1993 [JP] Japan ................................. 5-086118

[51] Int. Cl.$^6$ ................................................. G06F 11/00
[52] U.S. Cl. ............................... 371/57.2; 341/5; 178/19; 345/104; 345/174
[58] Field of Search .................... 371/48, 57.2, 57.1; 345/3, 33, 44, 180, 181, 182, 183, 184, 104, 174; 178/18, 19; 364/561; 341/5, 6

[56] References Cited

U.S. PATENT DOCUMENTS

| | | | |
|---|---|---|---|
| 4,205,199 | 5/1980 | Mochizuki ................................. | 178/19 |
| 4,357,672 | 11/1982 | Howells et al. ........................ | 364/561 |
| 4,477,877 | 10/1984 | Nakamura et al. ....................... | 178/18 |
| 4,568,799 | 2/1986 | Kobayashi et al. ....................... | 178/18 |
| 4,616,107 | 10/1986 | Abe et al. ................................ | 178/18 |
| 4,638,119 | 1/1987 | Blesser et al. ............................ | 178/18 |
| 4,672,154 | 6/1987 | Rodgers et al. .......................... | 178/18 |
| 4,697,244 | 9/1987 | Murakami et al. ...................... | 364/550 |
| 4,723,056 | 2/1988 | Tamaru et al. ........................... | 178/19 |
| 4,798,920 | 1/1989 | Makino et al. ........................... | 178/19 |
| 4,818,826 | 4/1989 | Kimura .................................... | 178/19 |
| 4,839,634 | 6/1989 | More et al. ............................. | 340/712 |
| 4,841,290 | 6/1989 | Nakano et al. ......................... | 340/707 |
| 4,945,348 | 7/1990 | Ibamoto et al. .......................... | 178/18 |
| 5,017,913 | 5/1991 | Kaneko et al. ............................ | 178/18 |
| 5,051,736 | 9/1991 | Bennett et al. ......................... | 340/707 |
| 5,187,467 | 2/1993 | Myers ..................................... | 340/707 |
| 5,218,174 | 6/1993 | Gray et al. ............................... | 178/19 |
| 5,243,332 | 9/1993 | Jacobson .................................. | 345/44 |

FOREIGN PATENT DOCUMENTS

| | | |
|---|---|---|
| 54-24538 | 2/1979 | Japan . |
| 7-62818 | 7/1995 | Japan . |

*Primary Examiner*—Robert W. Beausoliel, Jr.
*Assistant Examiner*—Albert Decady
*Attorney, Agent, or Firm*—David G. Conlin; Kevin J. Fournier

[57] ABSTRACT

An induction voltage signal induced at a detection electrode of a detection pen is binarized by a slice voltage "$e_s$". The number of pulses existing in the binary signal is counted by a counting device. The resulting count value obtained by the counting device and the number of times of electrode scanning in an x-coordinate detection period or a y-coordinate detection period are compared with each other by means of a comparator. When the number of pulses is greater, an error detection alarm signal is output by an alarm device. Thus the existence of the pulses based on the error detection signal is detected in the binary signal based on the induction voltage signal from the detection electrode to output the error detection alarm signal. The above arrangement allows the coordinates at the tip end of the detection pen to be detected in a stable and correct manner even when external noise is detected.

5 Claims, 19 Drawing Sheets

Fig. 3 PRIOR ART
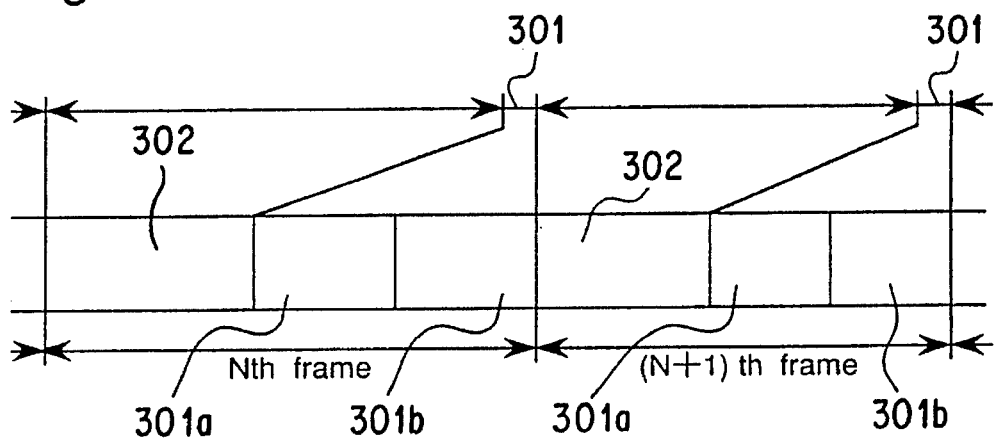
Fig. 4
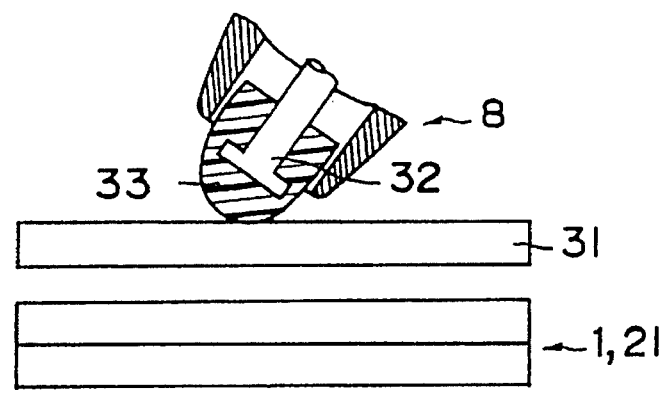
Fig. 5A PRIOR ART
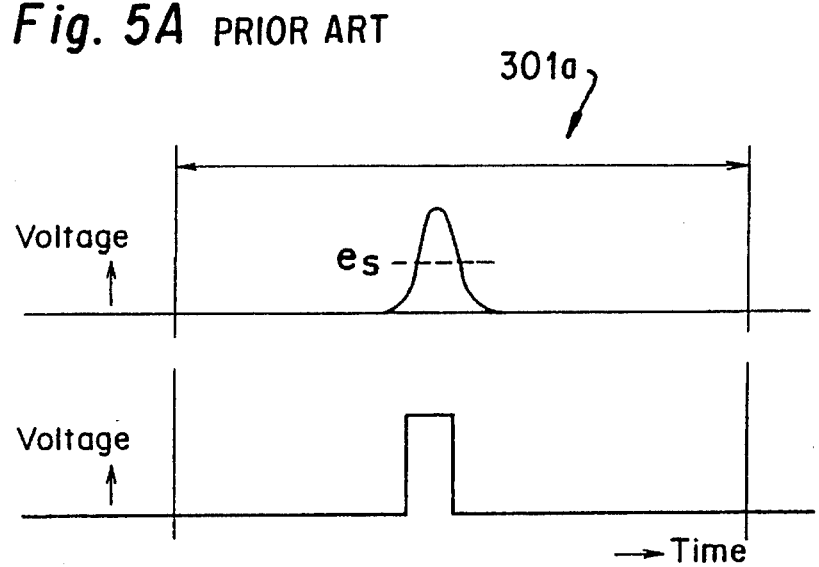
Fig. 5B PRIOR ART

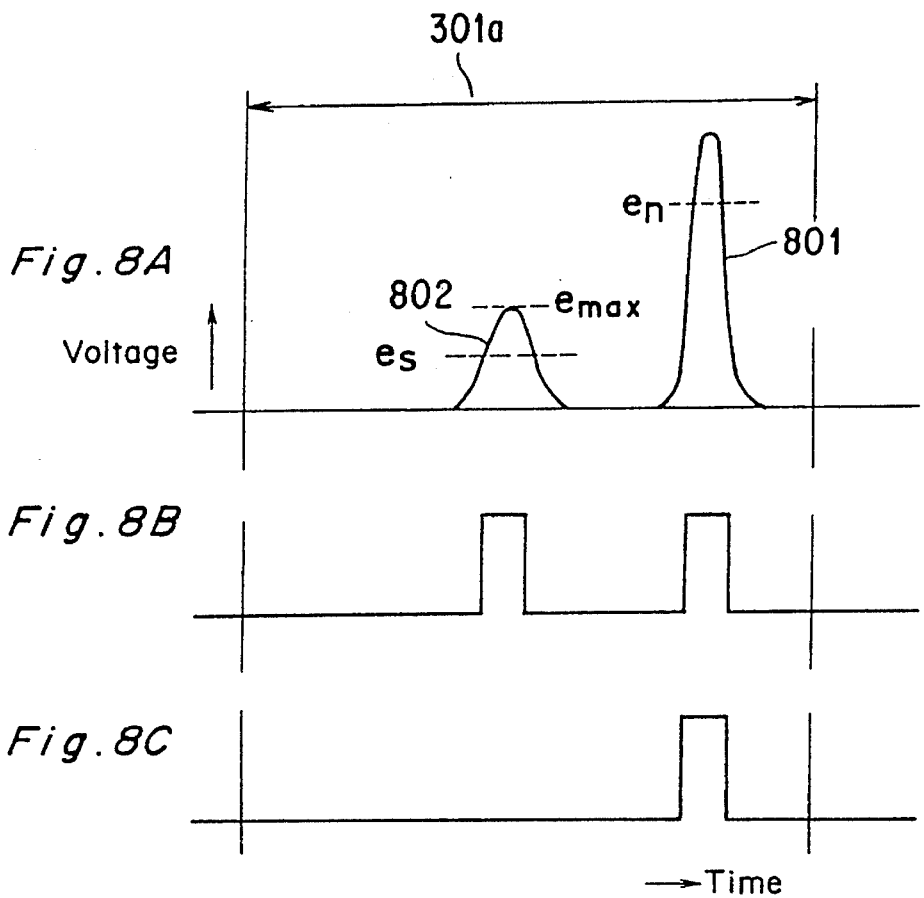
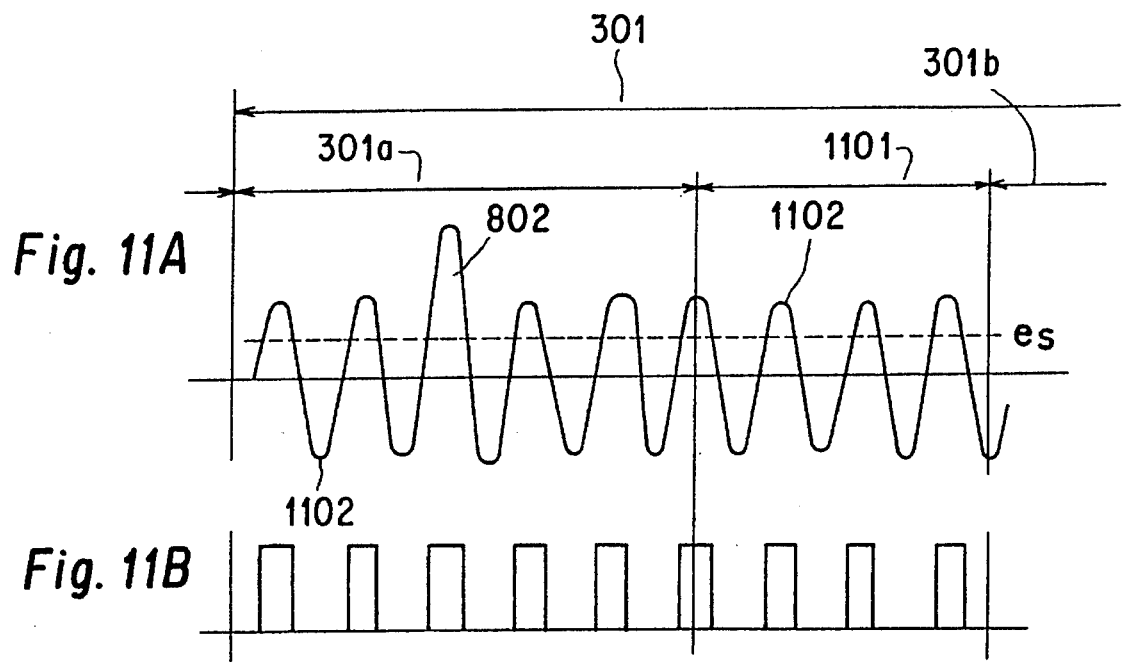

Fig. 22
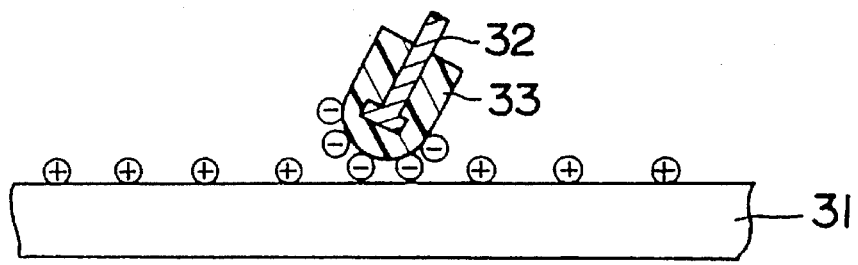
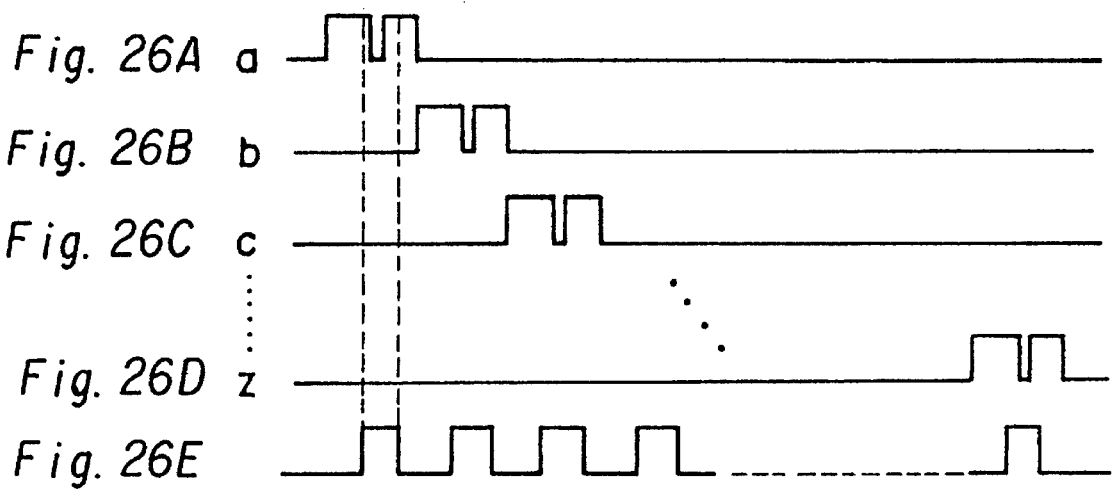
Fig. 26A a
Fig. 26B b
Fig. 26C c
Fig. 26D z
Fig. 26E

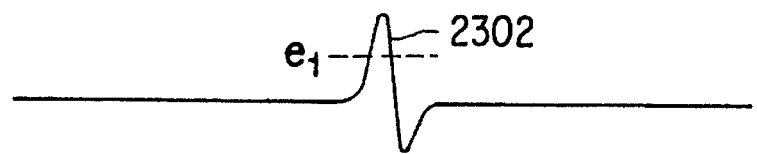
Fig.23A
Fig.23B
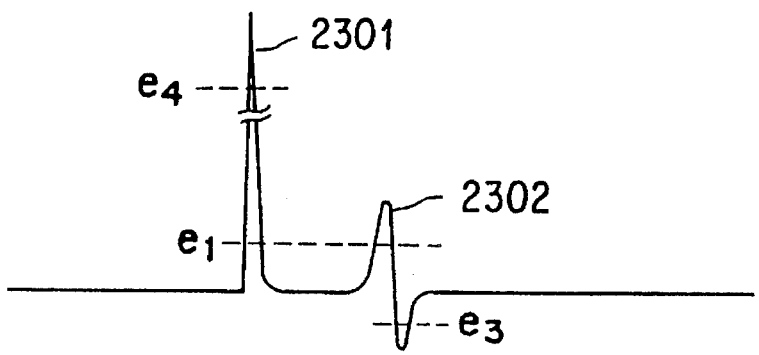
Fig.23C
Fig.23D
Fig.23E
Fig. 24A $x_1$
Fig. 24B $x_2$
Fig. 24C $x_3$
Fig. 24D $x_m$

DISPLAY-INTEGRATED TYPE TABLET DEVICE CAPABLE OF DETECTING CORRECT COORDINATES AT A TIP END OF A DETECTION PEN BY DETECTING EXTERNAL NOISE

BACKGROUND OF THE INVENTION

The present invention relates to a display-integrated type tablet device for use in a personal computer, a word processor, or the like.

As a means for inputting a handwritten letter or a figure into a computer or a word processor, there has been put into practical use a display-integrated type tablet device which is formed by laminating an electrostatic induction type tablet on a liquid crystal display and is capable of receiving an input of a letter or a figure into its electrostatic induction type tablet as if the letter or figure were written on a paper by writing implements.

However, in such a display-integrated type tablet device, electrodes are viewed as a grating on the display screen due to a difference in reflectance between a portion having an electrode and a portion having no electrode, which has been a cause of degrading the quality of an image displayed on the liquid crystal display screen.

FIGS. 1 and 2 show display-integrated type tablet devices proposed lately (Japanese Patent Laid-Open Publication No. 5-53726 and Japanese Patent Application No. 4-320545) each as a tablet free of the above-mentioned drawback, while FIG. 3 shows an explanatory view of an image display period and a coordinate detection period in each of those display-integrated type tablet devices. It should be noted that Japanese Patent Application No. 4-320545 shown in FIG. 2 is not laid-opened yet and thus is not a prior art.

In each of those display-integrated type tablet devices, electrodes concurrently serve as image display electrodes of a liquid crystal display (LCD) and as coordinate detection electrodes of an electrostatic type tablet device. There are provided in one frame period a coordinate detection period when designated coordinates on the tablet are detected and an image display period when an image is displayed as shown in FIG. 3, where the coordinate detection and image display are time-sharingly effected.

FIG. 1 shows a display-integrated type tablet device having a duty type LCD panel 1. Referring to FIG. 1, the LCD panel 1 is constructed by interposing liquid crystals between n number of common electrodes $Y_1$ through $Y_n$ (an arbitrary common electrode represented by Y hereinafter) and m number of segment electrodes $X_1$ through $X_m$ (an arbitrary segment electrode represented by X hereinafter) which are arranged at right angles to each other, in which each portion where a common electrode Y and a segment electrode X cross each other constitutes each pixel. In other words, n×m dot pixels are arranged in matrix in the LCD panel 1.

In the display-integrated type tablet device, various display control signals from a display control circuit 5 are selected by a switching circuit 4 to be supplied to a common electrode drive circuit 2 and a segment electrode drive circuit 3 in the image display period. Then drive pulses of a common electrode drive signal are applied to the common electrode Y by the common electrode drive circuit 2. Meanwhile, drive pulses of a segment electrode drive signal are applied to the segment electrode X by the segment electrode drive circuit 3.

In the coordinate detection period, various detection control signals from a detection control circuit 6 are selected by the switching circuit 4 to be supplied to the common electrode drive circuit 2 and the segment electrode drive circuit 3. By the common electrode drive circuit 2, scanning pulses of common electrode scanning signals $y_1$ through $y_n$ (an arbitrary common electrode scanning signal represented by y hereinafter) are successively applied to the common electrodes $Y_1$ through $Y_n$. Meanwhile, by the segment electrode drive circuit 3, scanning pulses of segment electrode scanning signals $x_1$ through $x_m$ (an arbitrary segment electrode scanning signal represented by x hereinafter) are successively applied to segment electrodes $X_1$ through $X_m$.

Referring to FIG. 3, the coordinate detection period 301 is separated into an x-coordinate detection period 301a and a subsequent y-coordinate detection period 301b. In the x-coordinate detection period, scanning pulses of the segment electrode scanning signal x are successively applied to the segment electrode X. In the y-coordinate detection period, scanning pulses of the common electrode scanning signal y are successively applied to the common electrode Y. The image display period 302 occurs before the coordinate detection period 301.

In the course of the above-mentioned operations, a voltage is induced at a designation coordinate detection pen (referred to merely as the "detection pen" hereinafter) 8 due to a stray capacitance between the segment electrode X or the common electrode Y and a detection electrode of the detection pen 8 attributed to the application of the scanning pulses. Then an x-coordinate detection circuit 10 and a y-coordinate detection circuit 11 detect the x-coordinate or the y-coordinate at the point pointed by the detection pen 8 based on an induction voltage signal obtained by amplifying in an amplifier 9 an induction voltage induced at the detection pen 8 and a timing signal from a control circuit 7.

FIG. 2 shows a display-integrated type tablet device having an active matrix type LCD panel 21. In the LCD panel 21, n number of gate bus line electrodes $G_1$ through $G_n$ (an arbitrary gate bus line electrode represented by G hereinafter) and m number of source bus line electrodes $S_1$ through $S_m$ (an arbitrary source bus line electrode represented by S hereinafter) are insulated and arranged at right angles to each other. In a position where the gate bus line electrode G and the source bus line electrode S cross each other is provided a TFT (Thin Film Transistor) 25. A pixel is composed of a pixel electrode 24 connected to the TFT 25, an opposite electrode (not shown) opposite to the pixel electrode 24, and liquid crystals filled in between both the electrodes. In other words, n×m dot display pixels are arranged in matrix in the LCD panel 21.

In the coordinate detection period, the detection pen 8 is placed on an input surface of the LCD panel 21 and a voltage induced at the detection electrode of the detection pen 8 due to an electrostatic coupling between the detection electrode of the detection pen 8 and the gate bus line electrode G or the source bus line electrode S is detected to obtain the coordinate at the tip end of the detection pen 8 by means of the x-coordinate detection circuit 10 or the y-coordinate detection circuit 11 in the same manner as in the display-integrated type tablet device having the duty type LCD panel 1.

Therefore, when a letter or a figure is input to the LCD panel 1 or the LCD panel 21 in the display-integrated type tablet device having the duty type LCD panel 1 or the display-integrated type tablet device having the active matrix type LCD panel 21, the trace of the tip end of the detection pen 8 can be displayed on the LCD panel 1 or the LCD panel 21 by sliding the detection pen 8 on the LCD panel 1 or the LCD panel 21 with the detection pen 8 put in contact with the input surface to obtain the coordinates at the tip end of the detection pen 8 based on an induction voltage signal detected by the detection pen 8 and outputting display data for displaying a dot in the position of the coordinates at the tip end from the display control circuit 5.

In the above case, the tip end portion of the detection pen 8 is covered with a tip end resin coat 33 having an insulation capability so that the input surface of a protection panel 31 for protecting the LCD panel 1 or the LCD panel 21 is not scratched by the detection electrode 32 as shown in FIG. 4 which illustrates in detail the tip end portion of the detection pen 8.

However, the above-mentioned display-integrated type tablet device having the duty type LCD panel 1 or the active matrix type LCD panel 21 has the following problems.

In the coordinate detection period, a scanning pulse of an electrode scanning signal is applied alternately to the segment electrode X or the source bus line electrode S and the common electrode Y or the gate bus line electrode G to induce a voltage at the detection electrode 32 having a high input impedance provided at the tip end of the detection pen 8 based on the scanning pulse to thereby detect the coordinates at the tip end of the detection pen 8 according to the timing of generation of the induction voltage.

However, the voltage induced at the detection electrode 32 of the detection pen 8 is very weak. Particularly in the display-integrated type tablet device having the duty type LCD panel 1 as shown in FIG. 1, an electric field exerted from the electrode placed in a lower position (segment electrode X in FIG. 1) among the segment electrode X and the common electrode Y is shielded by the electrode placed in the upper position (common electrode Y in FIG. 1). Therefore, a leakage electric field leaking through narrow gaps between the electrodes in the upper position must be detected in scanning the electrodes in the lower position. The induction voltage obtained in scanning the electrodes in the lower position is a very weak voltage of several millivolts.

In the display-integrated type tablet device having the active matrix type LCD panel 21 as shown in FIG. 2, the source bus line electrode S and the gate bus line electrode G are used as scanning electrodes for driving the TFT 25. However, since each of the source bus line electrode S and the gate bus line electrode G has an electrode width of several tens microns, the induction voltage detected by the detection pen 8 is very weak.

As described above, the voltage induced at the detection electrode 32 of the detection pen 8 is very weak in the display-integrated type tablet device having the duty type LCD panel 1 and the display-integrated type tablet device having the active matrix type LCD panel 21. Therefore, the induction voltage is very susceptible to external noise.

Among various sources of noise, there is noise caused by electric charges due to friction between the tip end resin coat 33 of the detection pen 8 and the protection panel 31 in the time of writing a letter or drawing a figure on the LCD panel 1 or the LCD panel 21 by sliding the detection pen 8 on the protection panel 31.

Since the frictional electric charges gradually reduces by a leak current through the tip end resin coat (dielectric material) 33 of the detection pen 8 and the protection panel 31, the noise caused by the frictional electric charges generated between the tip end resin coat 33 and the protection panel 31 is not problematic on normal conditions.

However, when the display-integrated type tablet device is placed in condition where the environmental humidity is abnormally low, the dielectric material of the tip end resin coat 33 of the detection pen 8 has a great resistance. Therefore, in the case where the voltage generated by the frictional electric charges surpasses the reduction, the voltage of the frictional electric charges increases, and when exceeding the critical point, it causes an instantaneous electric discharge toward a portion having less electric charges. The above-mentioned phenomenon also occurs in continuing handwriting with the detection pen 8. In such a case, since the voltage at the portion having electric charges greatly changes in a moment due to the electric discharge, a spike-shaped noise voltage is induced at the detection electrode 32 of the detection pen 8 and input as an error detection signal to the coordinate detection circuits 10 and 11.

In a very rare case, when an electric appliance operating at a high frequency and a high voltage is put close to the input surface of the LCD panel 1 or the LCD panel 21, the voltage from the electric appliance is detected as noise by the detection electrode 32 of the detection pen 8 to exert bad influence on the detection of coordinates at the tip end of the detection pen 8.

FIG. 5A shows the waveform of an induction voltage induced at the detection electrode 32 of the detection pen 8 in the time of scanning the segment electrode X placed in the lower position in the coordinate detection period in the duty type LCD panel 1 shown in Fig. 1, where no external noise exists. FIG. 5B shows a binary signal obtained by binarizing the induction voltage having a waveform as shown in FIG. 5A by a slice voltage "$e_s$" in a comparator (not shown).

In the above case, when the scanning is executed only once in the x-coordinate detection period, one pulse is generated in the resulting binary signal based on the induction voltage induced at the detection electrode 32 of the detection pen 8 as shown in FIG. 5B.

However, in the case where the detection electrode 32 of the detection pen 8 detects external noise in the x-coordinate detection period, a plurality of pulses are generated in the binary signal even when the segment electrode X is scanned only once. Consequently, an x-coordinate signal representing a coordinate that is different from the true coordinate at the tip end of the detection pen 8 and detected by the x-coordinate detection circuit 10 based on the pulse attributed to the external noise is also output.

Therefore, when a letter or a figure is input to the LCD panel 1 or the LCD panel 21, an image attributed to the external noise is displayed erroneously in a position that is not traced by the tip end of the detection pen 8 other than the true trace of the tip end of the detection pen 8 on the LCD panel 1 or the LCD panel 21.

SUMMARY OF THE INVENTION

The object of the present invention is therefore to provide a display-integrated type tablet device capable of detecting the coordinates at the tip end of the detection pen in a stable and correct manner even when external noise particularly attributed to the frictional electric charges at the detection pen is detected in the coordinate detection period.

In order to achieve the aforementioned object, there is provided a display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, the display-integrated type tablet device comprising:

count means which counts the number of times when the output signal output from the detection pen in the coordinate detection period exceeds a threshold level; and error detection determination means which compares a count number obtained by the count means in one coordinate detection period with the number of times of scanning the electrodes in the one coordinate detection period by means of the detection control circuit, and determines that, when the count number is greater than the number of times of scanning, error detection coordinates are included in coordinates on the display panel detected by the coordinate detection circuit in the coordinate detection period.

In the display-integrated type tablet device, the first drive circuit and the second drive circuit are controlled by the detection control circuit in the coordinate detection period to apply a scanning voltage alternately to the first electrodes and the second electrodes to thereby scan the first and second electrodes. Then a voltage is induced at the detection electrode of the detection pen due to the scanning voltage applied to the first electrodes or the second electrodes, and a signal based on the induction voltage is output from the detection pen. Then the number of occurrence of the case where the output signal from the detection pen exceeds the threshold level is counted by the count means.

Further based on the count result by the count means, the count number in one coordinate detection period and the number of times of scanning the electrodes by the detection control circuit in one coordinate detection period are compared with each other by the error detection determination means. When the count number is greater than the number of times of scanning, it is determined that error detection coordinates are included in the coordinates on the display panel detected by the coordinate detection circuit in the coordinate detection period.

When it is thus determined by the error detection determination means that error detection coordinates are included, by taking the measure of abandoning the coordinate value detected in the coordinate detection period or like measure, the coordinates at the tip end of the detection pen can be detected stably correctly even when external noise is detected by the detection pen.

Also, there is provided a display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, wherein the detection control circuit is constructed so as to provide a non-scanning period when no electrode is scanned in the coordinate detection period, and there is further comprised error detection determination means which observes a state of the output signal output from the detection pen in the non-scanning period, and determines that, when the state of the output signal exhibits deviation of the signal from a normal state where no external noise exists, error detection coordinates are included in coordinates on the display panel detected by the coordinate detection circuit in the coordinate detection period including the non-scanning period.

In the display-integrated type tablet device, a non-scanning period where no electrode is scanned is provided by the detection control circuit in the period of scanning the first electrodes and the second electrodes of the display panel in the coordinate detection period. Then the state of the output signal output from the detection pen in the non-scanning period is observed by the error detection determination means.

In the above place, when the state of the output signal from the detection pen exhibits deviation from the normal condition where no external noise exists in the non-scanning period, the error detection determination means determines that error detection coordinates are included in the coordinates on the display panel detected by the coordinate detection circuit in the coordinate detection period including the non-scanning period.

Further, there is provided a display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, the display-integrated type tablet device comprising:

binarization means which binarizes the output signal from the detection pen by different slice levels of a first slice level and a second slice level higher than the first slice level, and transmits a binary signal binarized by the first slice level to the coordinate detection circuit; and error detection determination means which observes a binary signal binarized by the second slice level by the binarization means, and determines that, when the level of the output signal exceeds the second slice level, coordinates on the display panel detected by the coordinate detection circuit at a point of time in the closest proximity to the point of time when the level of the output signal exceeds the second slice level are error detection coordinates.

In the display-integrated type tablet device, the output signal from the detection pen is binarized by the binarization means by different slice levels of the first slice level and the second slice level higher than the first slice level in the coordinate detection period. Then the binary signal binarized by the first slice level is transmitted to the coordinate detection circuit.

The binary signal binarized by the second slice level is observed by the error detection determination means. When the level of the output signal exceeds the second slice level, the error detection determination means determines that the coordinates on the display panel detected at a point of time in the closest proximity to the point of time when the level of the output signal exceeds the second slice level are error detection coordinates.

Furthermore, there is provided a display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, the display-integrated type tablet device comprising:

distance calculation means which calculates a distance between a first point that is detected by the coordinate detection circuit and represented by coordinates on the display panel and a second point that is represented by coordinates on the display panel and detected just previously; and error detection determination means which observes the distance between the first point and the second point on the display panel calculated by the distance calculation means, and determines that, when the distance satisfies a specified condition, coordinates at the first or second point is error detection coordinates.

In the display-integrated type tablet device, the distance between the first point represented by coordinates on the display panel detected by the coordinate detection circuit and the second point represented by coordinates detected just previously in the coordinate detection period is calculated by the distance calculation means. Then the distance between the first point and the second point on the display panel calculated by the distance calculation means is observed by the error detection determination means.

When the distance between the first point and the second point satisfies a specified condition, the error detection determination means determines that the coordinates at the first point or the second point on the display panel is error detection coordinates.

Moreover, there is provided a display-integrated type tablet device including a display panel having first electrodes arranged in parallel in one direction and second electrodes arranged in parallel in another direction different from the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, wherein the detection electrode of the detection pen is covered with a tip end member made of a dielectric material for protecting the detection electrode and a protection surface of the display panel, the coordinate detection circuit is constructed so as to detect the coordinates using only one polarity of the output signal from the detection pen with respect to a reference voltage, and a combination of material of the tip end member of the detection pen and material of the protection surface of the display panel is a combination such that a polarity of frictional electricity at the tip end of the detection pen is the same one polarity as the polarity of the output signal used by the coordinate detection circuit.

In the display-integrated type tablet device, the first drive circuit and the second drive circuit are controlled by the detection control circuit in the coordinate detection period to apply a scanning voltage separately to the first electrodes and the second electrodes of the display panel to scan the first and second electrodes. Then a voltage is induced at the detection electrode of the detection pen due to the scanning voltage applied to the first electrodes or the second electrodes, and a signal based on the induction voltage is output from the detection pen.

Then one side in polarity of the output signal from the detection pen with respect to the reference voltage is only used by the coordinate detection circuit to detect the coordinates on the display panel pointed by the tip end of the detection pen.

In the above case, frictional electricity having the same one polarity as that of the output signal used by the coordinate detection circuit is generated at the tip end member covering the detection electrode of the detection pen due to friction between the detection pen and the protection surface of the display panel. When an electric discharge occurs from the tip end member, an error detection signal having the polarity opposite to the above-mentioned one polarity is superimposed on the output signal from the detection pen. Since the error detection signal has the polarity opposite to the above-mentioned one polarity that is used for coordinate detection by the coordinate detection circuit, the error detection signal exerts no influence on the coordinate detection by the coordinate detection circuit. In other words, the error detection signal superimposed on the output signal is separated in detecting coordinates by the coordinate detection circuit on the display panel pointed by the tip end of the detection pen based on the output signal from the detection pen to allow the coordinate to be detected based only on the regular detection signal attributed to the scanning voltage applied to each of the electrodes.

Thus the coordinates at the tip end of the detection pen are stably detected by the coordinate detection circuit even when noise attributed to the frictional electricity is detected by the detection pen in the coordinate detection period.

In an embodiment, the first drive circuit and the second drive circuit each apply a scanning voltage to each of the electrodes in sequentially scanning the first electrodes or the second electrodes, where the scanning voltage is such that its polarity with respect to the reference voltage is the same one polarity as that of the frictional electricity at the tip end member of the detection pen. Consequently, the regular detection signal having the same one polarity as that of the output signal for use in coordinate detection by the coordinate detection circuit attributed to the scanning voltage is induced at the detection pen.

In contrast to the above, the polarity of the error detection signal superimposed on the output signal due to the frictional electricity at the tip end member of the detection pen is the other polarity opposite to the aforementioned one polarity. In short, the polarity of the regular detection signal and the polarity of the error detection signal are opposite to each other.

Therefore, even when the error detection signal attributed to the frictional electricity at the tip end member is superimposed on the output signal from the detection pen, the error detection signal is separated from the output signal to detect the coordinates at the detection pen based only on the regular detection signal attributed to the scanning voltage by means of the coordinate detection circuit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an explanatory view of an image display period and a coordinate detection period in the display-integrated type tablet devices shown in FIGS. 1 and 2;

FIG. 4 is a detailed view of the tip end of a detection pen of the devices shown in FIGS. 1, 2, 6, 7, 9, 10, 12, 13, 14, 17, 18, 20 and 21;

FIG. 5A and 5B are charts showing a normal induction voltage signal induced at the detection electrodes of the detection pens shown in FIGS. 1 and 2 and a binary signal based on the induction voltage signal;

FIGS. 8A, 8B and 8C are charts showing an induction voltage signal including an error detection signal induced at the detection pen of a display-integrated type tablet device of the present invention and binary signals obtained by binarizing the induction voltage signal by different slice voltages;

FIG. 11A and 11B are charts showing an induction voltage signal obtained in the case where a noise detection period is provided in a coordinate detection period and an exemplified binary signal of the induction voltage signal;

FIG. 22 is an explanatory view of frictional electric charges generated at a protection panel and the tip end dielectric material;

FIGS. 23A, 23B, 23C, 23D and 23E are charts showing induction voltage signals induced at a detection pen of a display-integrated type tablet device of the present invention and binary signals obtained by binarizing the induction voltage signals by various slice voltages;

FIGS. 24A–24D are charts showing an exemplified segment electrode scanning signal having a scanning pulse in negative polarity;

FIGS. 26A–26E are charts showing common electrode drive signals having drive pulses in positive polarity provided with a slit-shaped scanning pulse in the middle portion of the drive pulses.

DETAILED DESCRIPTION OF THE PREFERRED EMBODIMENTS

The following describes in detail several embodiments of the present invention with reference to the attached drawings.

First Embodiment

Figure 6:
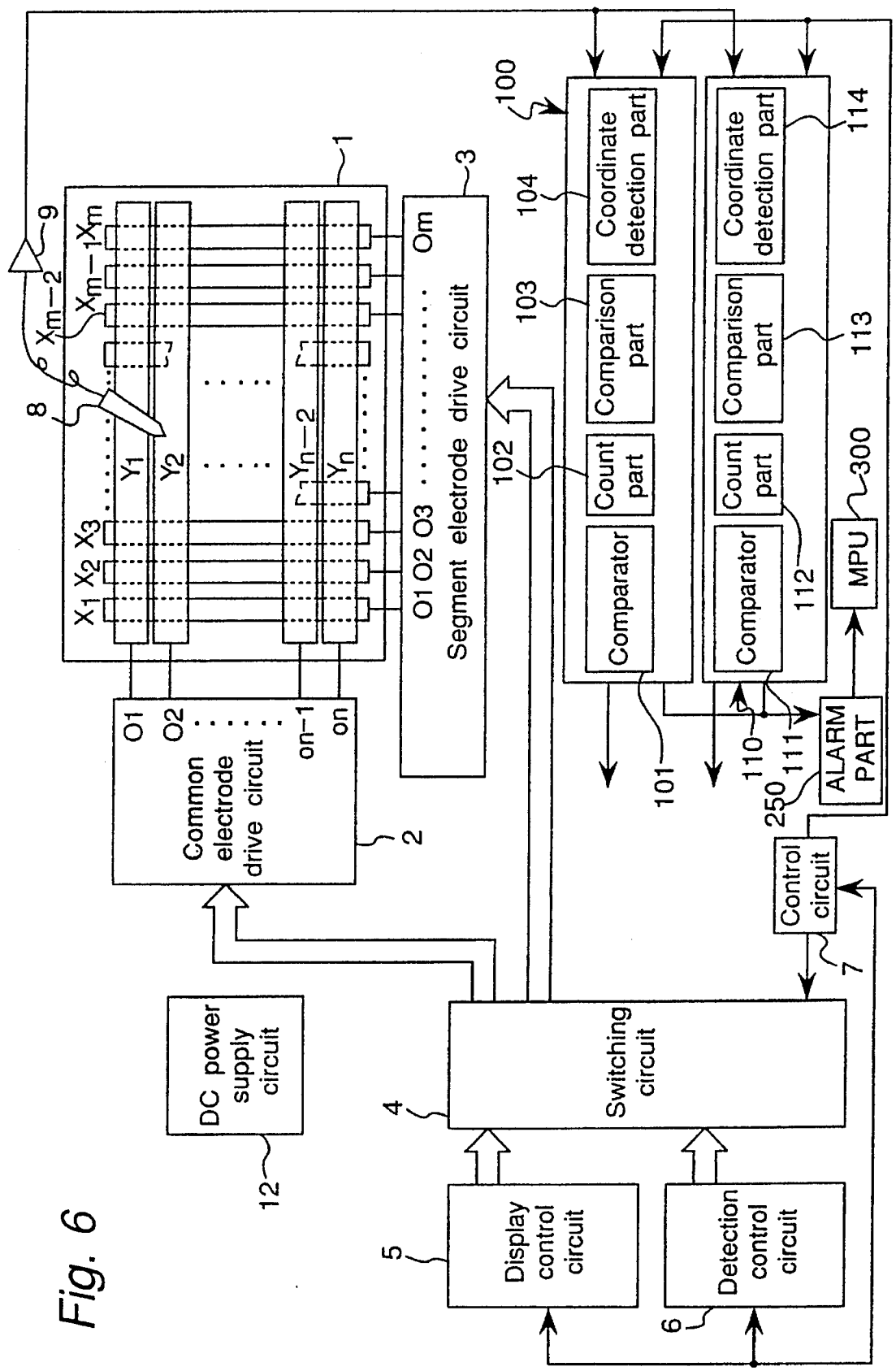
FIGS. 6, 9, 12, 17 and 20 are block diagrams of display-integrated type tablet devices of the present invention having a duty type LCD panel.
Figure 7:
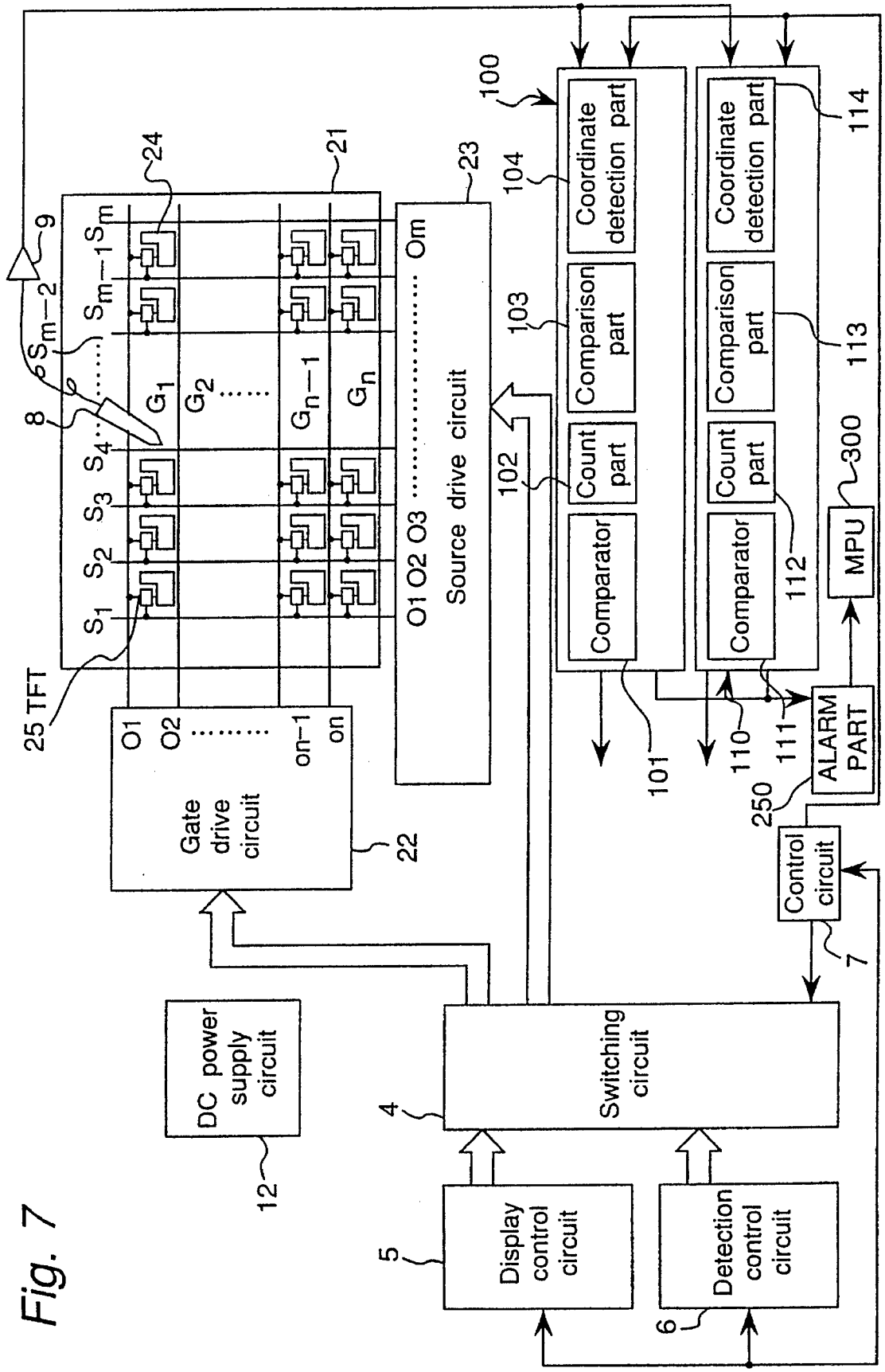
FIGS. 7, 10, 13, 18 and 21 are block diagrams of display-integrated type tablet devices of the present invention having an active matrix type LCD panel.

FIGS. 6 and 7 show display-integrated type tablet devices of the first embodiment. FIG. 4 shows the tip end of the detection pen of the devices of the first embodiment similarly to that of the prior art.

Figure 1:
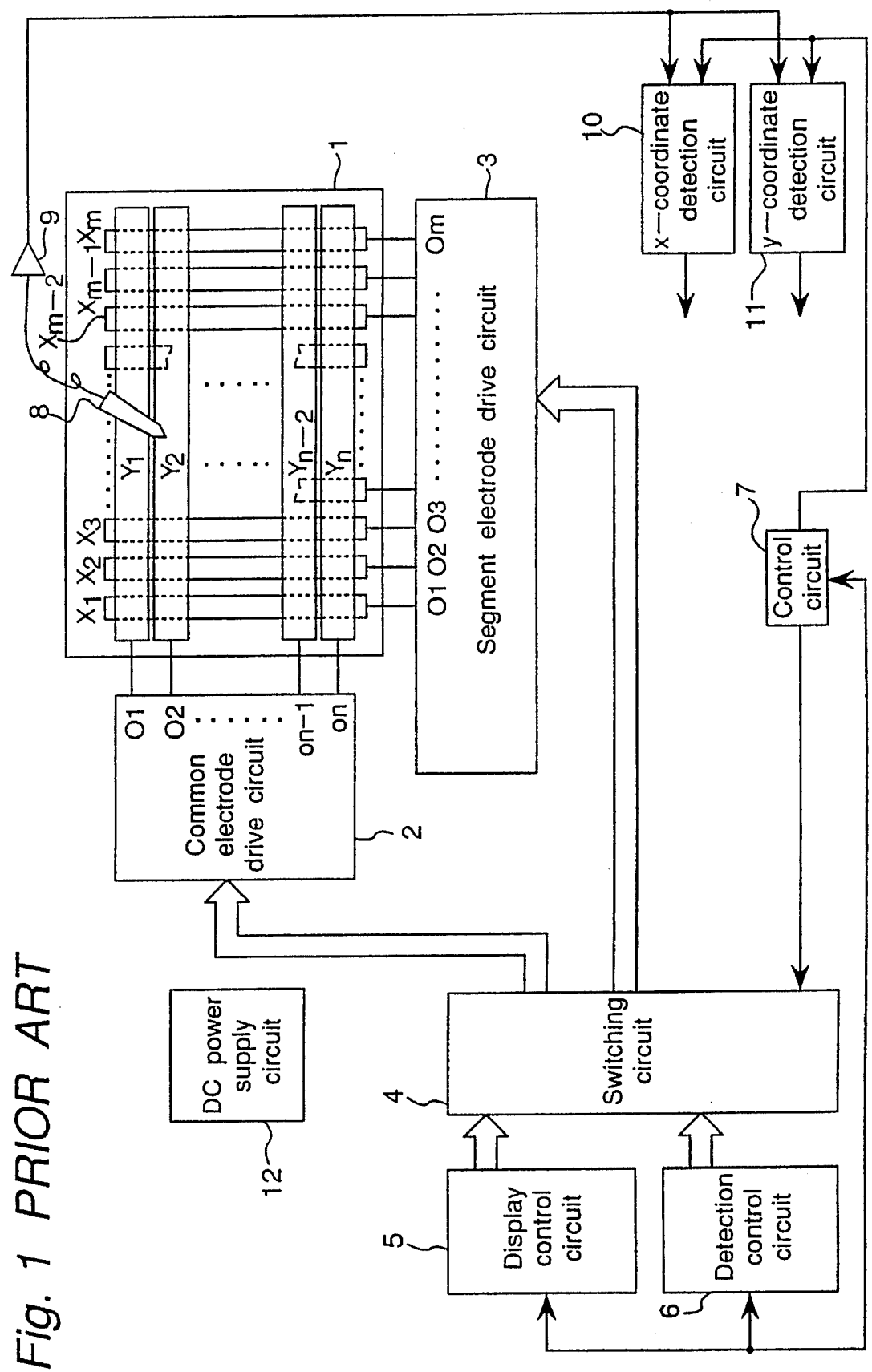
FIG. 1 is a block diagram of a conventional display-integrated type tablet device having a duty type LCD panel.
Figure 2:
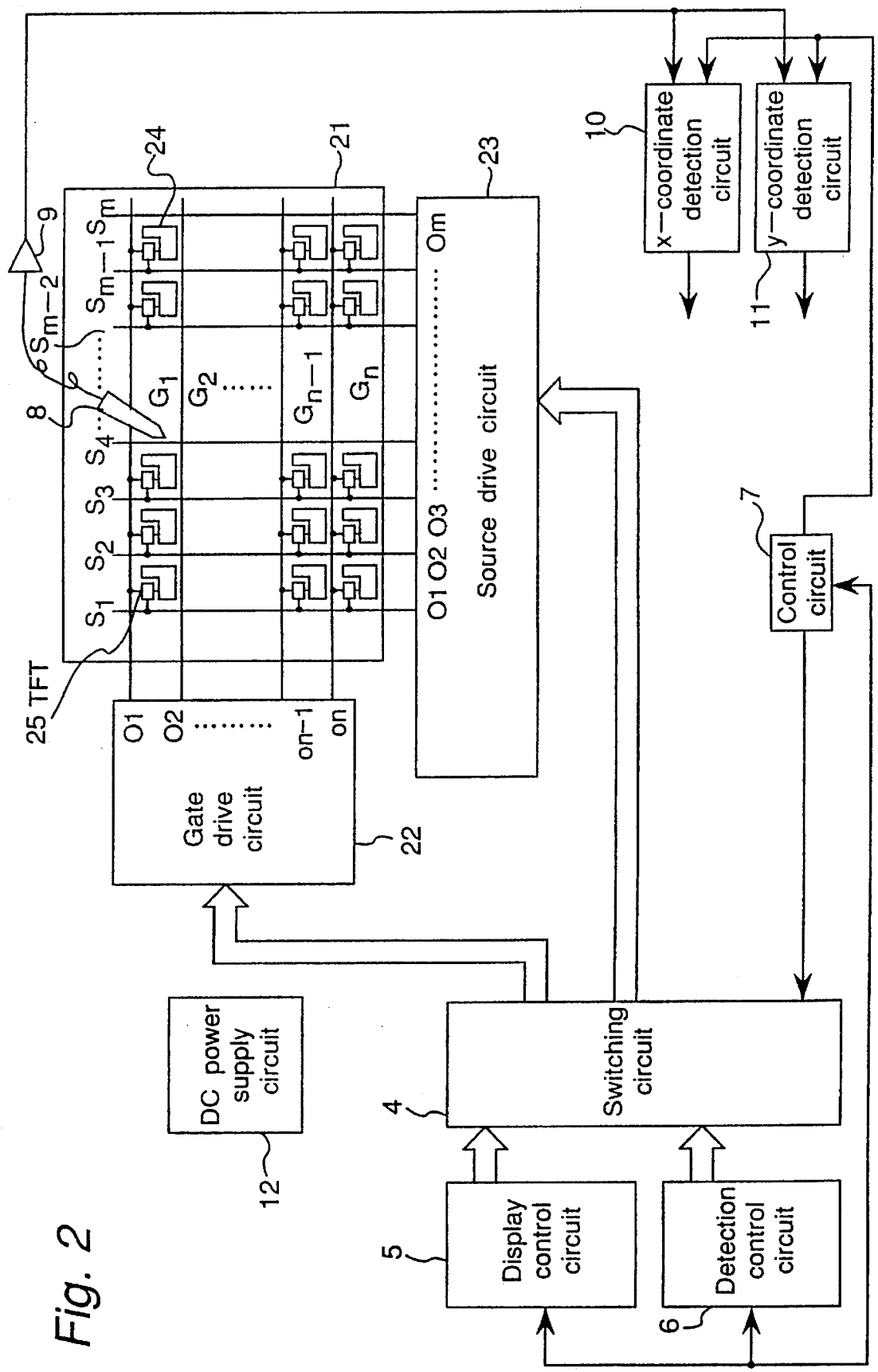
FIG. 2 is a block diagram of a display-integrated type tablet device having an active matrix type LCD panel.

The display-integrated type tablet devices shown in FIGS. 6 and 7 have the same construction as that of the display-integrated type tablet device having the duty type LCD panel 1 shown in FIG. 1 or the display-integrated type tablet device having the active matrix type LCD panel 21 shown in FIG. 2, except for an x-coordinate detection circuit 100, a y-coordinate detection circuit 110 and an alarm part 250. Therefore, the same parts as shown in FIGS. 1 and 2 are designated by the same reference numerals as shown in FIGS. 1 and 2, and their descriptions are omitted.

FIG. 8A shows the waveform of an induction voltage induced at the detection electrode 32 of the detection pen 8 in the coordinate detection period in the display-integrated type tablet device shown in FIG. 6 having the duty type LCD panel 1 or the display-integrated type tablet device shown in FIG. 7 having the active matrix type LCD panel 21. The waveform of FIG. 8A is obtained in the case where a regular induction voltage signal attributed to a scanning pulse of a segment electrode scanning signal x or a source bus line electrode scanning signal (the signal referred to as the "regular detection signal" hereinafter) is generated and followed by the generation of an induction voltage signal attributed to external noise (the signal referred to as the "error detection signal" hereinafter) in the x-coordinate detection period. FIG. 8B shows a binary signal obtained by amplifying the induction voltage shown in FIG. 8A in an amplifier 9 and then binarizing the resulting signal by a slice voltage "$e_s$" in a comparator 101 or 111 built-in the x-coordinate detection circuit 100 or the y-coordinate detection circuit 110.

Whether or not an error detection signal attributed to the external noise is included in the induction voltage signal induced at the detection electrode 32 of the detection pen 8 can be determined by counting the number of pulses existing in the binary signal output from the comparator 101 or 111 in the x-coordinate detection period or the y-coordinate detection period.

Therefore, in the present first embodiment, the x-coordinate detection circuit 10 and the y-coordinate detection circuit 11 are further provided with count parts 102, 112 and comparison parts 103 and 113 in addition to coordinates detection parts 104 and 114, and the number of pulses included in the binary signal is counted by the count parts 102 and 112 based on the induction voltage signal detected by the detection electrode 32 in the x-coordinate detection period and the y-coordinate detection period. Then the count results obtained by the count parts 102 and 112 are compared with a preset number of times of scanning electrodes in the x-coordinate detection period and the y-coordinate detection period by the comparison parts 103 and 113. When the number of pulses is greater than the preset number of times, an error detection alarm signal is output by an alarm parts 250.

For example, in the case of FIGS. 8A and 8B, an error detection signal 801 is included other than to the regular detection signal 802 as shown in FIG. 8A, and therefore two pulses are generated as shown in FIG. 8B, meaning that the detection is an error detection.

In short, the comparison parts 103 and 113 constitute the error detection determination means, respectively.

In such a case, detection of error coordinates (referred to as the "error detection coordinates" hereinafter) due to the entry of an error detection signal in the induction voltage signal detected by the detection electrode 32 occurs mostly in the time of scanning the electrode placed in the lower position (segment electrode X in the display-integrated type tablet device having the duty type LCD panel 1 of the present embodiment) where the level of the regular detection signal is low. Almost no error detection signal is obtained in the period of scanning the electrode placed in the upper position (y-coordinate detection period in the present embodiment) because the level of the regular detection signal is high. Therefore, the count part 102 and the comparison part 103 may be provided only in the coordinate detection circuit relevant to the electrode in the lower position among the x-coordinate detection circuit 10 and the y-coordinate detection circuit 11 to execute determination of the error detection coordinates in scanning the electrode in the lower position.

The error detection alarm signal thus output from the alarm part 250 is taken into a microprocessor 300 being processing means. Then by the microprocessor 300, an x-coordinate detection signal and a y-coordinate detection signal output from the x-coordinate detection circuit 10 and the y-coordinate detection circuit 11 in the coordinate detection period when the error detection alarm signal is generated are canceled.

In the above case, since the coordinates at the tip end of the detection pen 8 is abandoned regardless of the fact that the regular detection signal has been detected, the trace (i.e., a letter or a figure) of the tip end of the detection pen 8 becomes unnatural. Therefore, by using the coordinates obtained in the previous coordinate detection period as the coordinates in the current coordinate detection period, or using the coordinates at the middle point between the coordinates obtained in the previous coordinate detection period and the coordinates to be obtained in the next coordinate detection period as the coordinates in the current coordinate detection period, the occurrence of the aforementioned unnaturalness can be prevented.

When all the coordinate signals output from the x-coordinate detection circuit 100 and the y-coordinate detection circuit 110 are canceled in a manner as described above when the error detection alarm signal is generated, not only the coordinate signal based on the error detection signal but also the coordinate signal based on the regular detection signal are canceled.

Therefore, by obtaining the regular coordinate values in a manner as follows even when the error detection alarm signal is output, the accuracy in detecting the coordinates at the tip end of the detection pen 8 can be further improved.

In detail, the currently calculated values of coordinates at the tip end of the detection pen 8 is compared with the previously calculated values of coordinates at the tip end by the microprocessor 300 to determine whether or not the currently calculated coordinates are error detection coordinates. The currently calculated coordinate is an error detection coordinate when the difference between the currently calculated coordinate and the previously calculated value is greater than a preset value. Only when the coordinates are determined to be the error detection coordinates, the coordinates at the tip end is abandoned. With the above-mentioned arrangement, the coordinates at the tip end of the detection pen 8 can be calculated always based on the regular detection signal to allow the coordinate detection accuracy to be improved.

As described above, detection of error coordinates due to the error detection signal superimposed on the induction voltage signal from the detection pen 8 occurs mostly in scanning the electrode in the lower position, and scarcely in scanning the electrode in the upper position. Therefore, when the segment electrode X is the electrode in the lower position as shown in FIG. 6, the aforementioned various processes may be effected only on the x-coordinate detection signal from the x-coordinate detection circuit 10 while allowing the y-coordinate detection signal from the y-coordinate detection circuit 11 to be output as it is.

Second Embodiment

Figure 9:
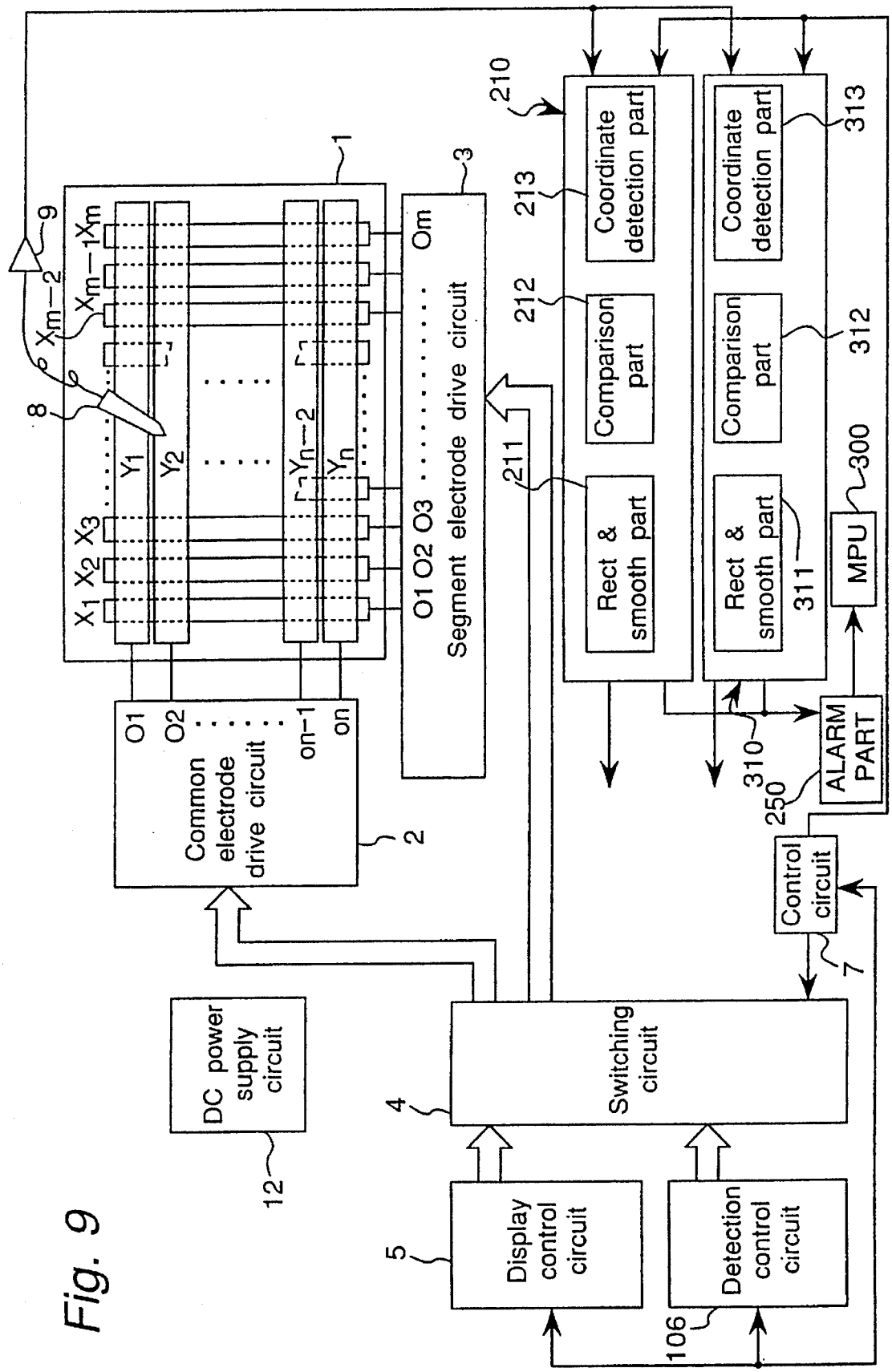
Figure 10:
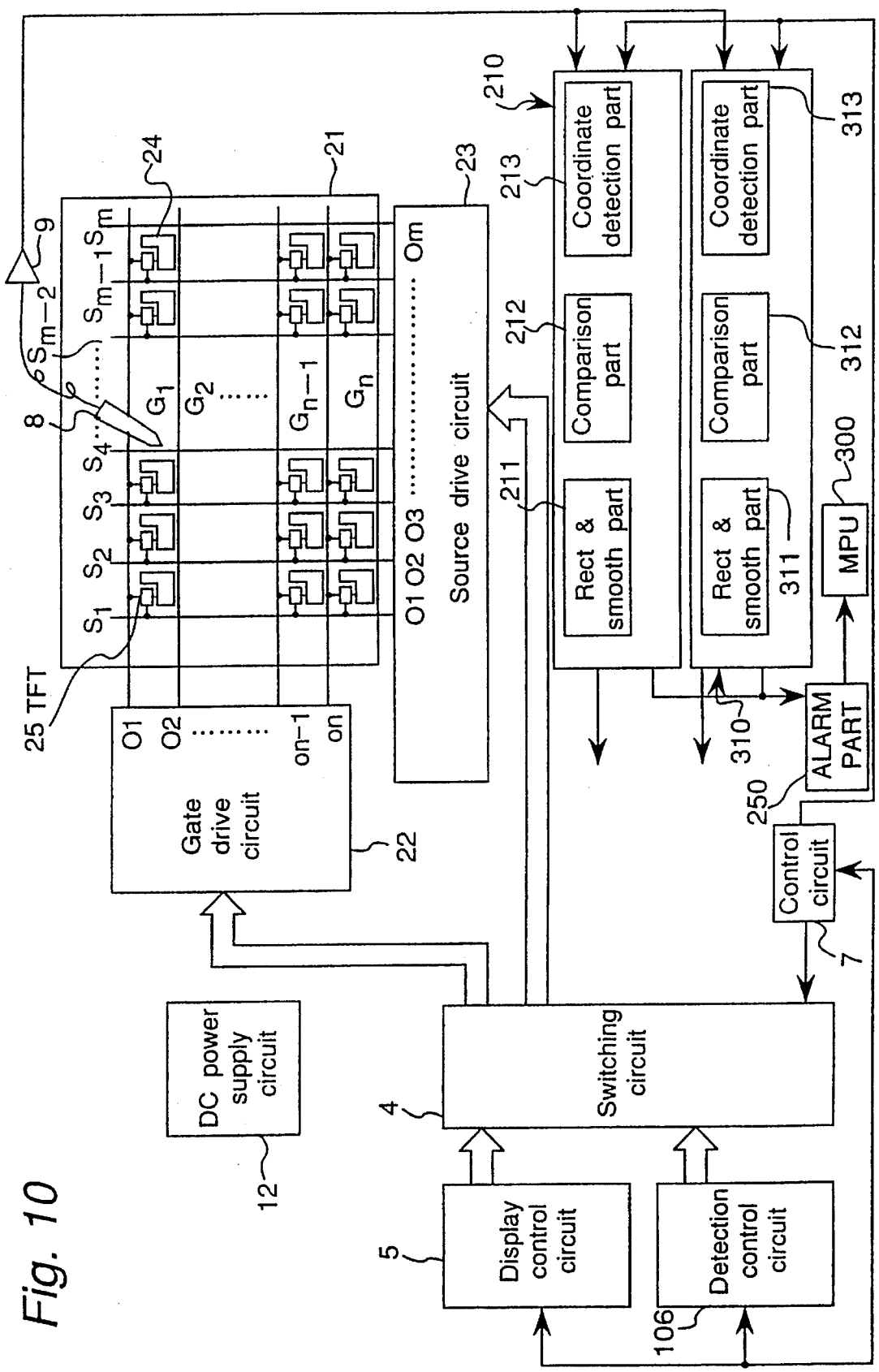

FIGS. 9 and 10 show display-integrated type tablet devices of the second embodiment.

The display-integrated type tablet devices shown in FIGS. 9 and 10 have the same construction as that of the display-integrated type tablet device having the duty type LCD panel 1 shown in FIG. 6 or the display-integrated type tablet device having the active matrix type LCD panel 21 shown in FIG. 7, except for an x-coordinate detection circuit 210, a y-coordinate detection circuit 310 and a detection control circuit 106. Therefore, the same parts as shown in FIGS. 6 and 7 are designated by the same reference numerals as shown in FIGS. 6 and 7, and their descriptions are omitted.

The detection control circuit 106 of a display-integrated type tablet device of the present embodiment operates so as to provide a noise detection period in between the x-coordinate detection period and the y-coordinate detection period of the coordinate detection period in a manner as shown in FIG. 11A and 11B. The noise detection period 1101 is set up immediately after the x-coordinate detection period 301A in FIGS. 11A and 11B, where a period of several tens microseconds is practically provided in between the x-coordinate detection period and the noise detection period so as to avoid the influence of scanning of the segment electrode X.

In the noise detection period, scanning pulses of the electrode scanning signal are applied neither to the segment electrode X nor to the common electrode Y. Therefore, only a DC voltage is applied to the segment electrode X and the common electrode Y in the noise detection period, where no induction voltage is generated at the detection electrode 32 of the detection pen 8 (see FIG. 4) to keep the output voltage from the detection pen 8 at "0 V" in the period.

However, when the detection pen 8 is receiving external AC noise, an induction voltage signal (noise component 1102) is output from the detection pen 8 even in the noise detection period as shown in FIGS. 11A and 11B. Therefore, when the induction voltage signal is detected even in the noise detection period, it is highly possible that the detection pen 8 is receiving the influence of noise also in the x-coordinate detection period or the y-coordinate detection period.

In view of the above, full-wave rectification and smoothing parts 211, 311 and comparison parts 212 and 312 in addition to coordinate detection parts 213 and 313 are provided in the x-coordinate detection circuit 210 and the y-coordinate detection circuit 310 to subject the induction voltage from the detection pen 8 obtained in the noise detection period to full-wave rectification by the full-wave rectification means and then to smoothing. Then the post-rectification voltages are compared with a reference voltage by the comparison parts 212 and 312. When the post-rectification voltage is exceeding the reference voltage, it is determined that the influence of noise is exerted in the x-coordinate detection period and the y-coordinate detection period.

Figure 12:
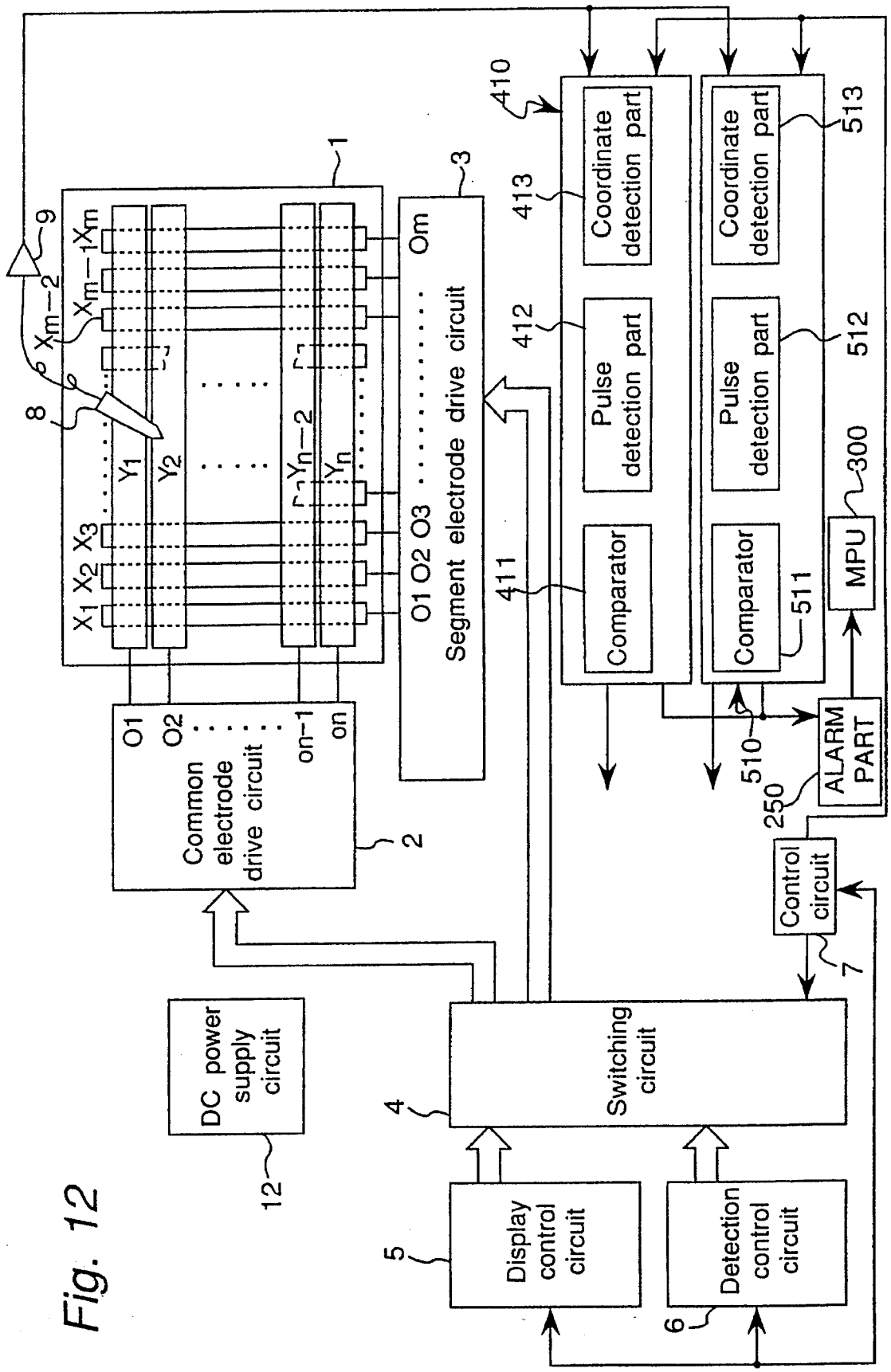
Figure 13:
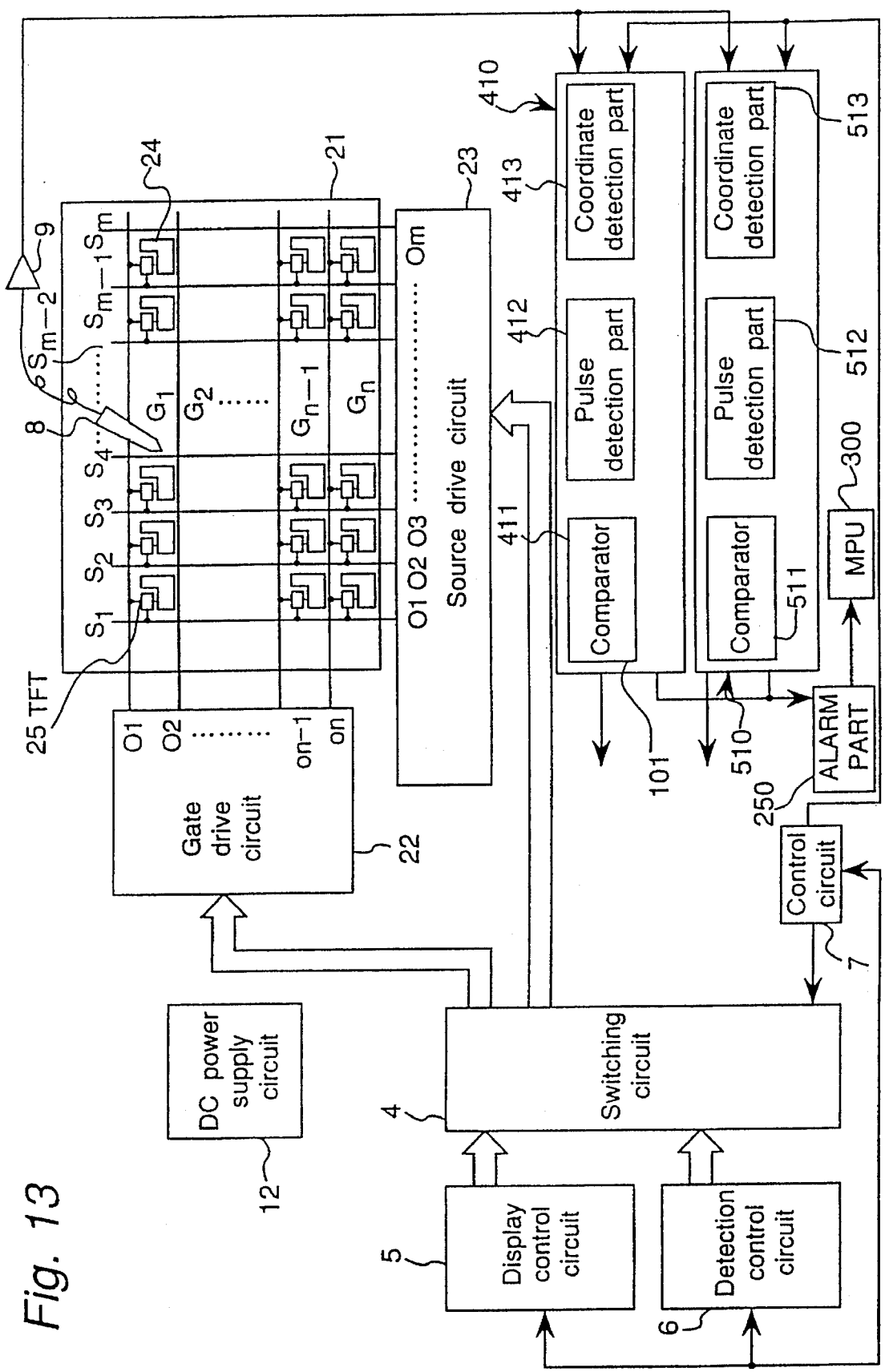

Otherwise, as shown in FIGS. 12 and 13, the induction voltage from the detection pen 8 in the noise detection period is amplified in the amplifier 9 and then binarized by a comparator 411 or 511. When a pulse is detected in the binary signal by a pulse detection part 412 or 512, it is determined that the influence of noise is exerted in the x-coordinate detection period and the y-coordinate detection period.

In short, the combination of the full-wave rectification part and the comparison part or the combination of the comparator and the pulse detection part constitute an error detection determination means.

When it is thus determined that the influence of noise is exerted in the x-coordinate detection period and the y-coordinate detection period, the alarm part 250 outputs the error detection alarm signal to the MPU 300. Subsequently by executing the same processing as in the first embodiment by the MPU 300, the correct coordinates at the tip end can be detected even when the detection electrode 32 of the detection pen 8 detects noise.

Third Embodiment

The level of an induction voltage induced at the detection electrode 32 due to friction between the tip end resin coat 33 of the detection pen 8 and the protection panel 31 of the LCD panels 1 and 21 great as shown in FIG. 4 is very great.

Figure 14:
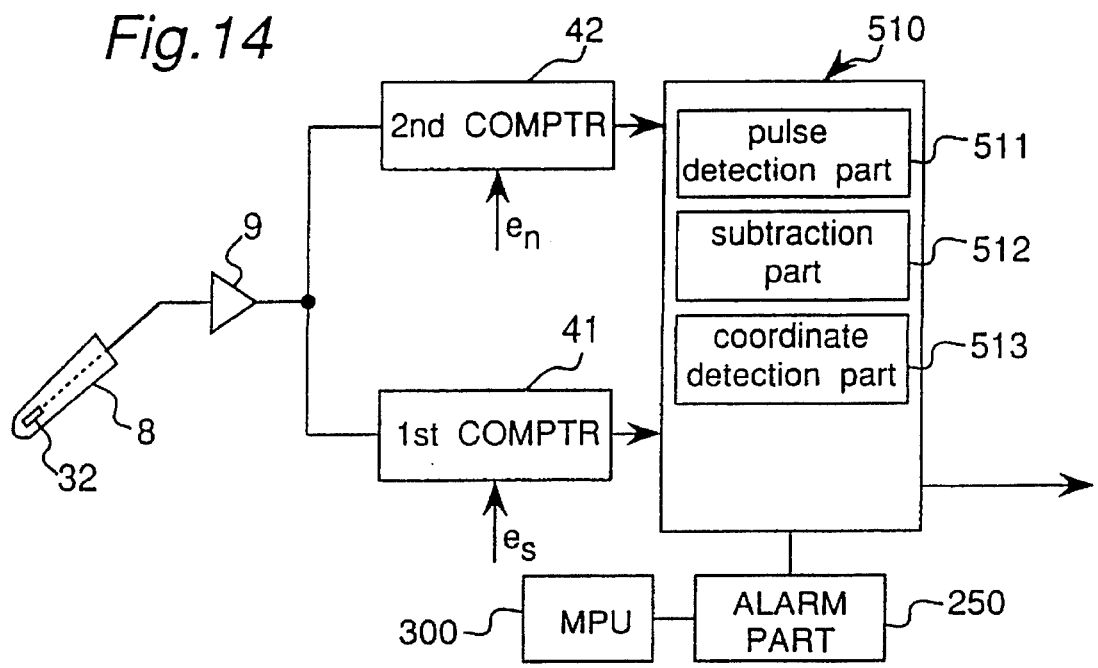
FIG. 14 is an explanatory view of a structure for obtaining binary signals by binarizing the induction voltage signal by different slice voltages as shown in FIG. 8.

Therefore, in the present embodiment, the induction voltage from the detection pen 8 is binarized by two comparators of a first comparator 41 and a second comparator 42 having different reference voltages as shown in FIG. 14. The first comparator 41 is provided for detecting the x-coordinate. On the other hand, the second comparator 42 is a comparator for detecting noise.

Assuming that the reference voltage of the first comparator 41 is "$e_s$" and the reference voltage of the second comparator 42 is "$e_n$", the voltage "$e_s$" and the voltage "$e_n$" have the relation:

$$e_s < e_{max} < e_n$$

where $e_{max}$ is the peak value of the regular detection signal induced at the detection electrode 32.

Although the above arrangement is in processing the induction voltage signal input to the x-coordinate detection circuit 510, the same arrangement is used for processing the induction voltage signal input to the y-coordinate detection circuit. The parts which are not shown in FIG. 14 are the same as in FIG. 1 and 2.

It is now assumed that an induction voltage that is output from the detection electrode 32 in the x-coordinate detection period and then input to the first comparator 41 and the second comparator 42 has a waveform as shown in FIG. 8A. In such a case, a binary signal which has been binarized by the slice voltage "$e_s$" to have two pulses (pulses based on the regular detection signal and the error detection signal) as shown in FIG. 8B is output from the first comparator 41. On the other hand, a binary signal which has been binarized by the slice voltage "$e_n$" to have one pulse (pulse based on the error detection signal) as shown in FIG. 8C is output from the second comparator 42.

Meanwhile, the x-coordinate detection circuit 10 is provided with a pulse detection part 511 to observe the binary signal from the second comparator 42 by the pulse detection part 511. The pulse detection part 511 outputs an error detection signal to the MPU 300 via an alarm part 250 when a pulse is detected in the binary signal from the second comparator 42.

Paying attention to the fact that the pulse based on the error detection signal exists in both the binary signals of the binary signal from the first comparator 41 and the binary signal from the second comparator 42, a subtraction part 512 is provided in the x-coordinate detection circuit 10. Then by subtracting the binary signal from the second comparator 42 from the binary signal from the first comparator 41, only the pulse based on the regular detection signal can be obtained.

In short, the first comparator 41 and the second comparator 42 constitute the binarization means, and the pulse detection part 512 constitutes the error detection determination means in the present embodiment.

In addition, the above arrangement is also adopted for detecting a y-coordinate.

Fourth Embodiment

Figure 17:
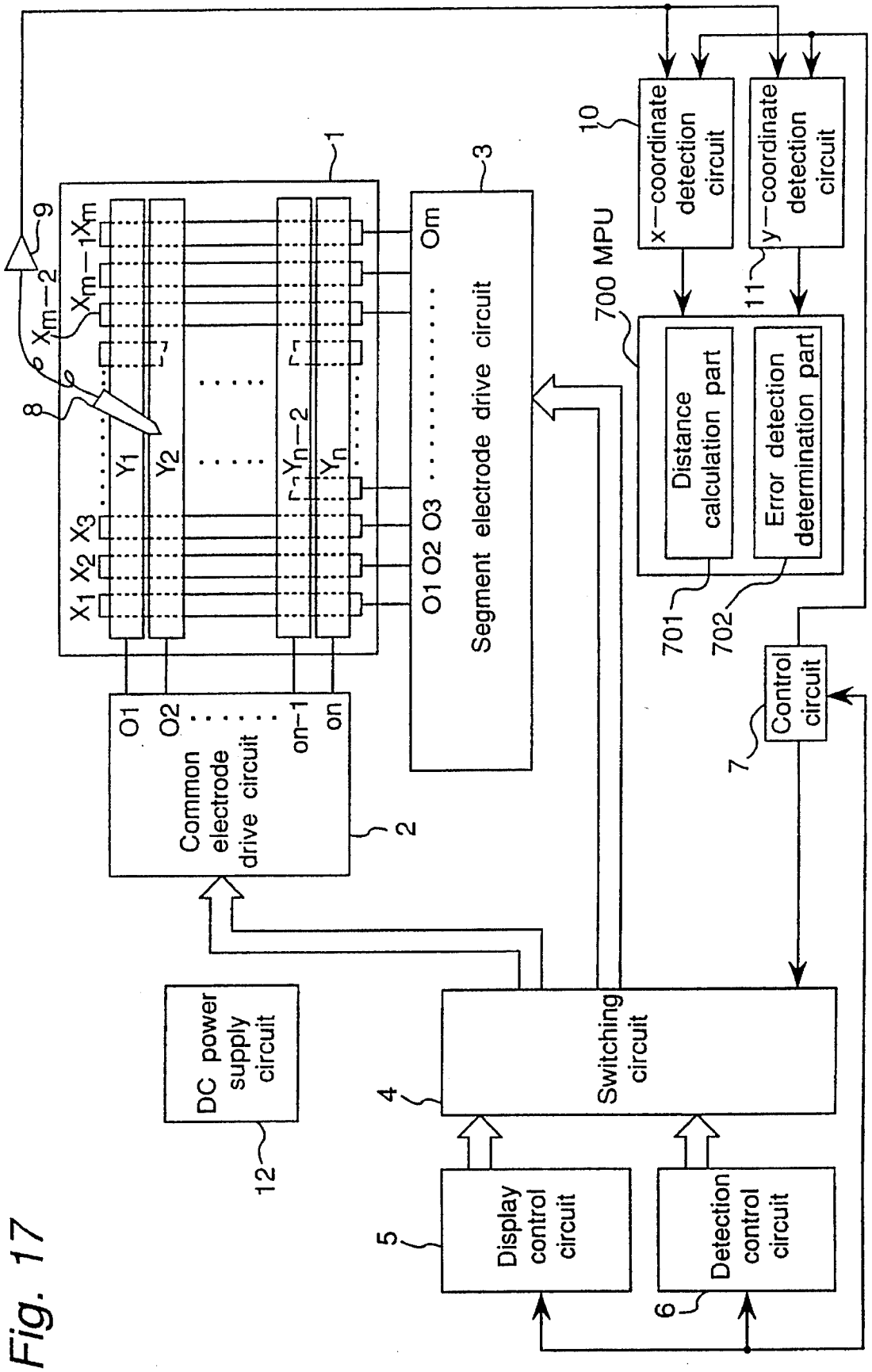
Figure 18:
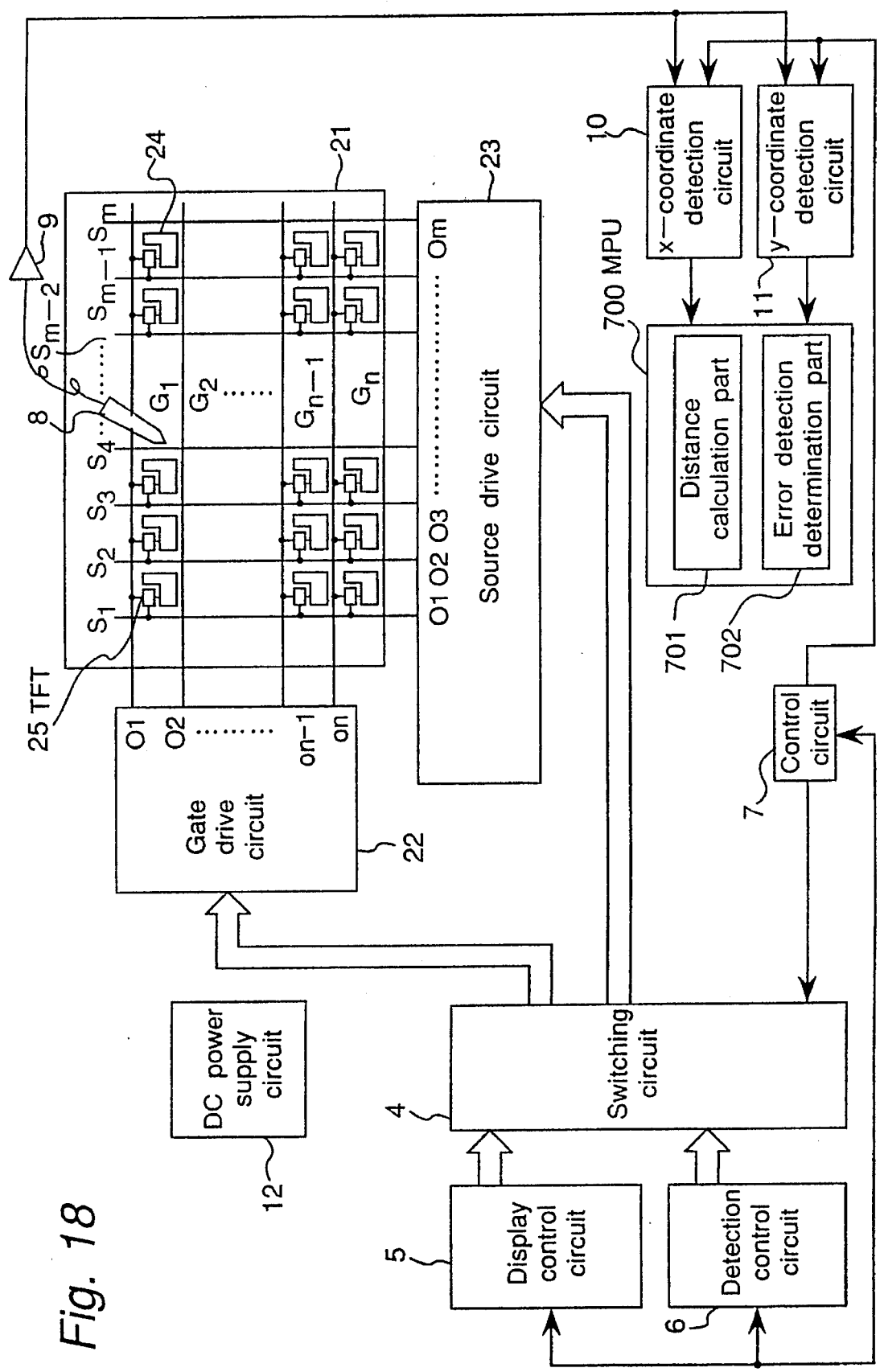

FIGS. 17 and 18 show the fourth embodiment. The same parts in FIGS. 17 and 18 as in FIGS. 1 and 2 are indicated by the same reference numerals. In the present fourth embodiment, error detection coordinates are detected from a relative coordinate position of the tip end of a detection pen 8 based on the x-coordinate signal successively output from an x-coordinate detection circuit 10 and a y-coordinate signal successively output from a y-coordinate detection circuit 11 of the display-integrated type tablet device in the coordinate detection period.

Figure 15:
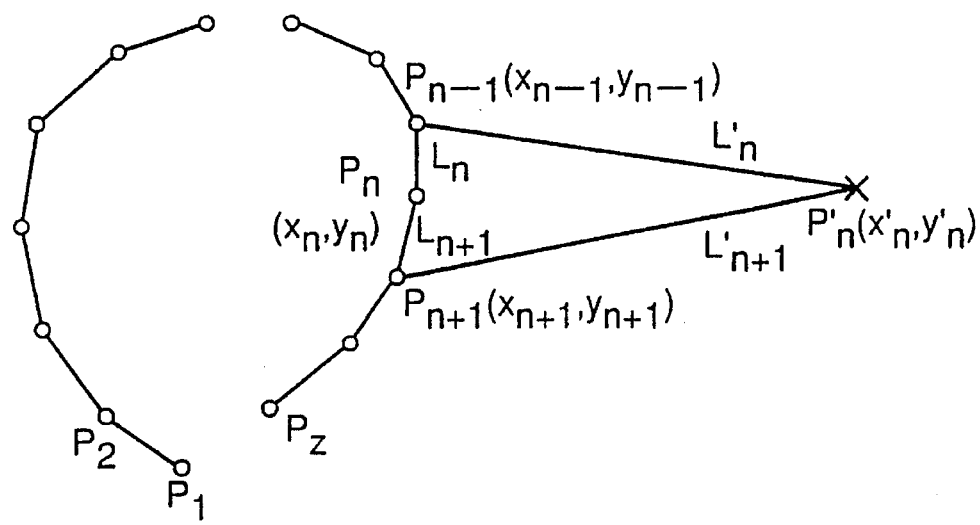
FIG. 15 is an explanatory view of a method for detecting error detection coordinates based on the distance between calculated tip end coordinate points.

FIG. 15 shows a coordinate point $P_n$ at the tip end of the detection pen 8 calculated based on the x-coordinate signal and the y-coordinate signal as well as a distance $L_n$ between two adjoining coordinate points $P_{n-1}$ and $P_n$.

In the present case, the distance between coordinate points: . . . $L_{n-1}$, $L_n$, $L_{n+1}$, . . . depends on the writing speed of the operator, where no abrupt change takes place in the writing speed because of a limitation in ability of human beings. However, when an error detection coordinate point $P'_n$ enters as shown in FIG. 15, distances $L'_n$ and $L'_{n+1}$ to the error detection coordinate point $P'_n$ exhibit an abnormal increase to have values of change that cannot be achieved manually as compared with the normal distances $L_n$ and $L_{n+1}$.

Therefore, by observing the distance $L_n$ between adjoining coordinate points successively detected in the coordinate detection period the coordinate point $P'_n$ that cannot be achieved manually can be removed as error detection coordinates.

The above-mentioned method can be achieved according to the following procedure.

A microprocessor 700 being processing means has a distance calculation part 701 and an error detection determination part 702. The distance calculation part 701 calculates the coordinates $(x_n, y_n)$ of the point $P_n$ pointed by the tip end of the detection pen 8 based on the x-coordinate signal from the x-coordinate detection circuit 10 and the y-coordinate signal from the y-coordinate detection circuit 11, and then calculates the distance $L_n$ between the point $P_n$ $(x_n, y_n)$ and the previous detection point $P_{n-1}$ $(x_{n-1}, y_{n-1})$. The error detection determination part 702 removes coordinates at the point $P_n$ $(x_n, y_n)$ as error detection coordinates, when the value of the distance $L_n$ exceeds a comparison value $L_{max}$.

The distance calculation part 701 and the error detection determination part 702 respectively constitutes the distance calculation means and the error detection determination means.

In the above case, the error detection coordinates can be securely removed when the comparison value $L_{max}$ is set up at a great value, however, the error detection coordinates cannot be removed when $L'_n$ is about 15 mm. When the comparison value $L_{max}$ is set at about 15 mm, the error detection coordinates can be removed when the distance $L'_n$ is about 15 mm, however, it is possible that the regular detection coordinates are removed.

The following describes a method capable of coping with the above-mentioned problem.

Figure 16:
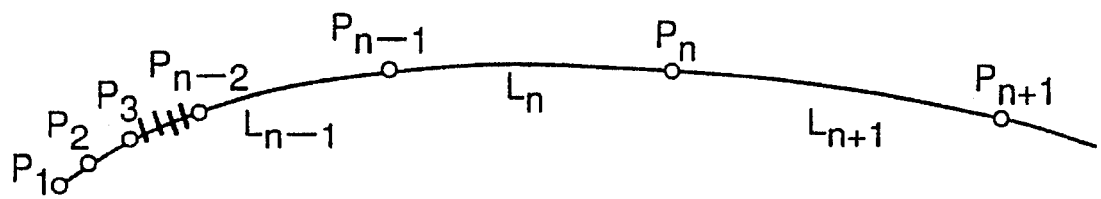
FIG. 16 is an exemplified trace of the tip end of the detection pen.

FIG. 16 shows an exemplified trace of the tip end of the detection pen 8 when the writing speed with the detection pen 8 is very fast to make the distance $L_n$ exceed 20 mm. Such a trace as in the example is scarcely observed in the time of inputting a letter, however, it is often observed in a trace made in the time of inputting a figure or executing a gesture operation.

In consideration of the above fact, the input mode is separated into a letter input mode and a figure input mode.

Then the comparison value $L_{max}$ is reduced in the letter input mode, while the comparison value $L_{max}$ is increased in the figure input mode. With the above-mentioned arrangement, the error detection coordinates can be correctly removed according to the writing speed.

The following describes an example in which a writing speed ratio is obtained.

Figure 19:
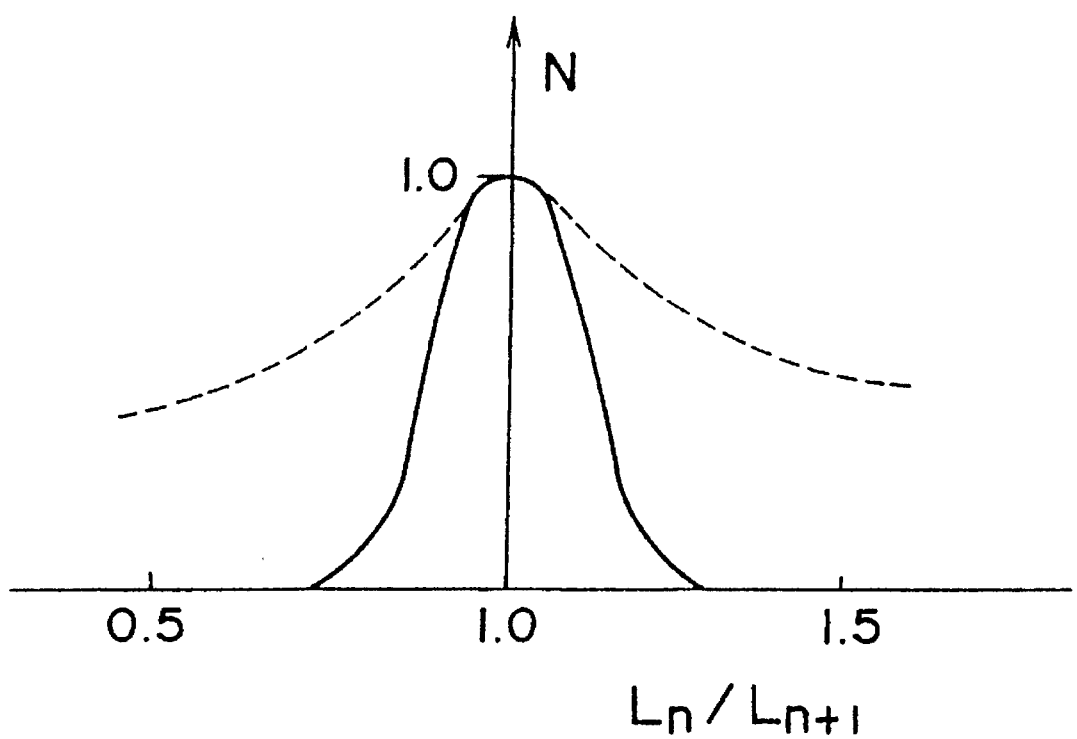
FIG. 19 is a graph showing a distribution state of a writing speed ratio $L_n/L_{n+1}$ with the detection pen.

FIG. 19 shows a writing speed ratio $L_n/L_{n+1}$ by means of the detection pen 8 obtained through samples of several operators. Referring to FIG. 19, the speed ratio $L_n/L_{n+1}$ is distributed in a wide range in the case of a slow-speed writing (dotted line) when the writing speed is slower than 5 mm/sec. However, in the case of a high-speed writing (solid line) when the writing speed is not slower than 5 mm/sec, the speed ratio $L_n/L_{n+1}$ falls within the range of appropriately 0.7 to 1.3. The vertical axis represents the number of times.

Therefore, the value of distance $L_n$ calculated by the distance calculation part 701 based on the coordinates at the two points $P_{n+1}$ and $P_n$ is observed by the error detection determination part 702. In the case of the slow-speed writing when the writing speed is slower than 5 mm/sec, the coordinates at the tip end of the detection pen 8 are adopted as they are. In the case of the high-speed writing when the writing speed is not slower than 5 mm/sec, the speed ratio $L_n/L_{n+1}$ is calculated by the error detection determination part 702. When the value of the speed ratio $L_n/L_{n+1}$ is out of the maximum value of the distribution range shown in FIG. 19, the obtained coordinates at the tip end of the detection pen are abandoned.

In any of the aforementioned examples, the error detection coordinates are detected with regard to the movement distance $L_n$ of the position at the tip end of the detection pen 8 in a unit time. However, in the display-integrated type tablet device having the duty type LCD panel 1 as described above, the error detection coordinates are practically detected by the detection electrode 32 mostly when the electrode placed in the lower position (segment electrode X in the present embodiment) of the LCD panel 1 is scanned. Therefore, it is not always required to use the movement distance $L_n$ of the position at the tip end of the detection pen 8 in a unit time as in the above description, and it may be acceptable to pay attention to the movement distance in a unit time of the x-coordinate value at the tip end of the detection pen 8.

Although the coordinates at the tip end coordinate points: $P_1, P_2, \ldots P_{n-1}, P_n, \ldots, P_z$ as shown in FIG. 15 are selected as effective coordinates in the fourth embodiment, the coordinates at the middle point $P'_1$ between the two points $P_1$ and $P_2$, the coordinates at the middle point $P'_2$ between the two points $P_2$ and $P_3$, . . . may be the effective coordinates.

The above description is made by taking the TFT active matrix type as an example of the active matrix for use in the LCD panel 21 in each of the aforementioned embodiments. However, the active matrix of the present invention is not limited to the above-mentioned active matrix, and therefore it may be a diode type active matrix, a MIM (Metal-Insulator-Metal) type active matrix, a varistor type active matrix, or the like.

Fifth Embodiment

Before describing the fifth embodiment, reference is made to the polarity of frictional electricity.

When different two sorts of dielectric materials are rubbed with each other, the surface of one dielectric material is charged with positive electric charges, while the surface of the other dielectric material is charged with negative electric charges. In such a case, the polarity of electric charges at each side depends on the combination of the materials.

Table 1 shows a part of the polarity system of frictional electricity in the time of rubbing different materials with each other. In Table 1, the higher the position of each material is, the more the material is charged with positive electric charges. Meanwhile, the lower the position of each material is, the less the material is charged with negative electric charges.

TABLE 1

Positive electric charge
↑
| Glass
| Polyacetal
| Acryl
| Nylon
| Polyester
| Polyurethane
| Polyethylene terephthalate
| Epoxy
| Polycarbonate
| Vinyl chloride
| Teflon
↓
Negative electric charge According to Table 1, when, for example, the acryl and the polycarbonate are rubbed with each other, the surface of the acryl is charged with positive electric charges and the surface of the polycarbonate is charged with negative electric charges.

Figure 20:
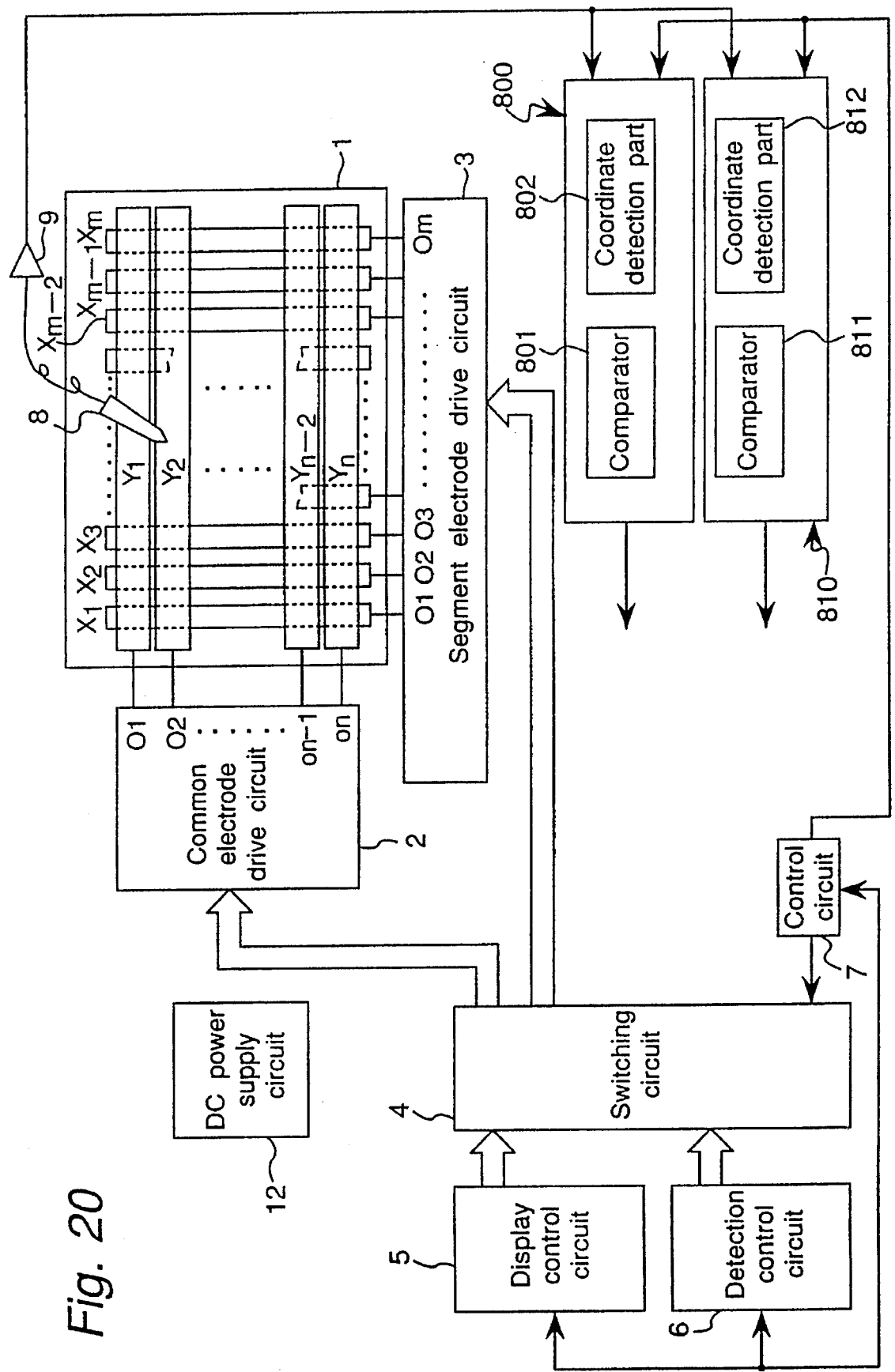
Figure 21:
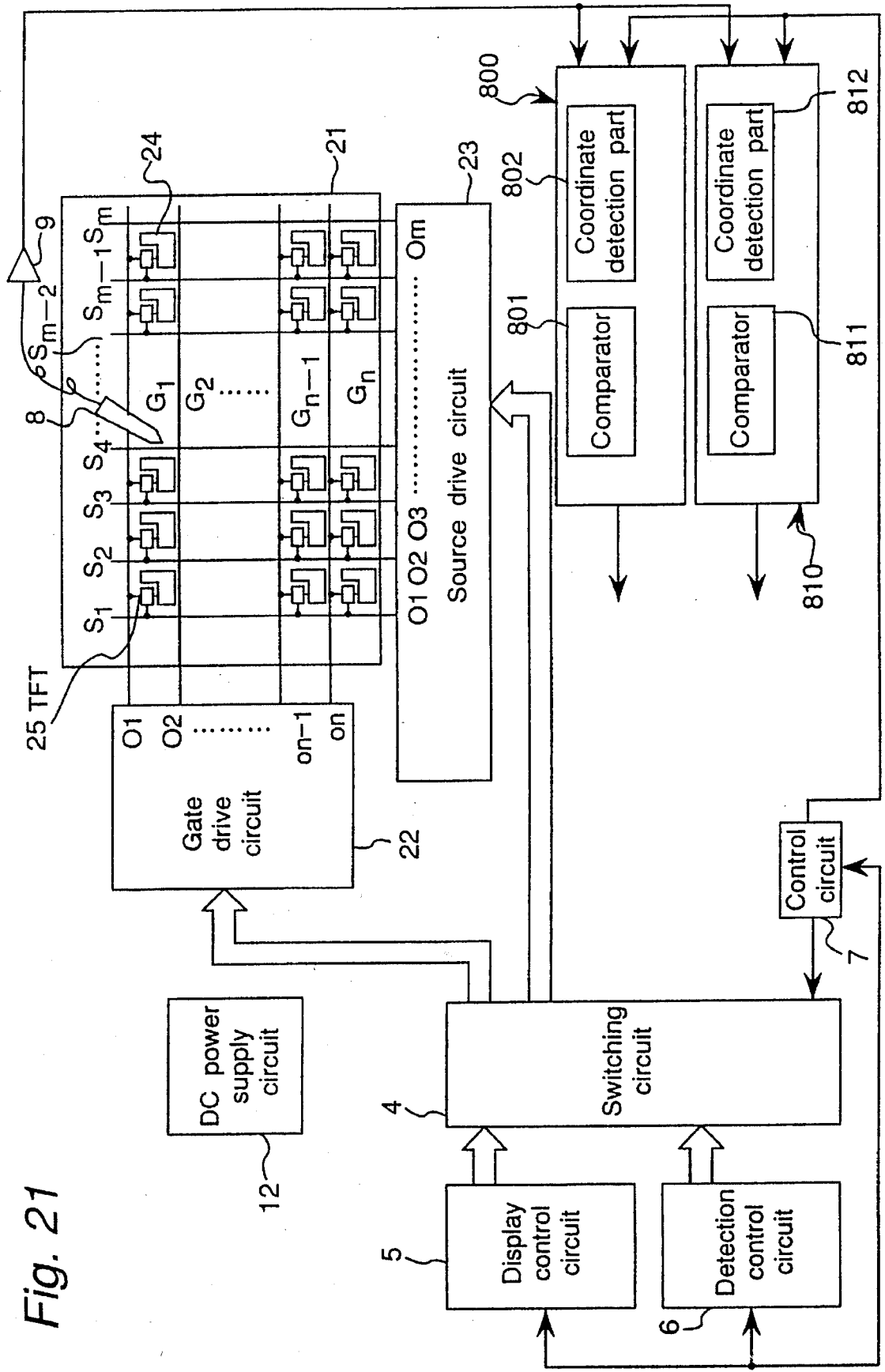

FIGS. 4, 20 and 21 show this fifth embodiment. The same parts in FIG. 20 as in FIG. 1 are shown by the same reference numerals. It is assumed that the tip end dielectric material 33 of the display-integrated type tablet device of the present embodiment is made of polycarbonate and the protection panel i.e. input panel 31 of the LCD panels 1 and 21 is made of acryl.

In such a case, when handwriting is effected with the detection pen 8 on the protection panel 31, the friction surface of the tip end dielectric material 33 is electrically charged as shown in FIG. 22. When an electric discharge occurs, an impulse-shaped error detection signal 2301 in positive polarity as shown in FIG. 23C is induced at the detection electrode 32 of the detection pen 8. In contrast to the above, a regular detection signal (2302) attributed to the scanning pulse of the electrode scanning signal applied to the segment electrode X (source bus line electrode S) or the common electrode Y (gate bus line electrode G) has a waveform composed of a component in positive polarity and a subsequent component in negative polarity.

In consideration of the above fact, the present embodiment takes the measure of making a slice voltage of comparators 801 and 811 for binarizing the induction voltage induced at the detection electrode 32 of the detection pen 8 be a negative voltage "$e_3$" opposite to the polarity of the impulse-shaped error detection signal. With the above-mentioned arrangement, only a pulse based on the regular detection signal as shown in FIG. 23E exists in the binary signal output from the comparator to allow the coordinates at the tip end of the detection pen 8 based on the binary signal to be the correct coordinates.

Sixth Embodiment

Then the following describes an embodiment for enhancing the effect of the above-mentioned embodiment.

Figure 25A:
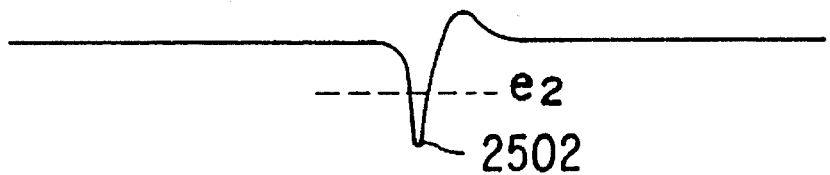
FIGS. 25A, 25B, 25C, 25D, 25E and 25F are charts showing induction voltage signals induced at the detection pen obtained in scanning electrodes with the segment electrode scanning signal shown in FIG. 24 and binary signals obtained by binarizing the induction voltage signals by various slice voltages.

When the protection panel 31 is made of acryl and the tip end dielectric material 33 is made of polycarbonate, the friction surface of the tip end dielectric material 33 is charged with negative electric charges due to writing with the detection pen 8. Taking as an example the x-coordinate detection period in a display-integrated type tablet device of FIG. 20 having the duty type LCD panel 1, the polarity of scanning pulse of the segment electrode scanning signal x to be applied to the segment electrode X is made negative as shown in FIG. 24. As a result, a regular detection signal composed of a component in negative polarity and a subsequent component in positive polarity as shown in FIG. 25A is induced at the detection electrode 32.

Figure 25B:

Therefore, by making the slice voltage of the comparators 801 and 811 be a negative voltage "$e_2$", a binary signal as shown in FIG. 25B can be obtained.

In other words, since the polarity of the impulse-shaped error detection signal induced due to the frictional electricity as described hereinbefore is positive, the regular detection signal and the error detection signal have opposite polarities. Therefore, the signals can be easily separated from each other by making the slice voltage of the comparators 801 and 811 have the same polarity as that of the regular detection signal.

When the protection panel 31 is formed of, for example, polycarbonate and the tip end dielectric material 33 is formed of nylon contrary to the above case, the friction surface of the tip end dielectric material 33 is charged with positive electric charges. Consequently, when an electric discharge occurs, an impulse-shaped error detection signal having the negative polarity is induced at the detection electrode 32 of the detection pen 8.

Therefore, with the above-mentioned arrangement, a regular detection signal having the positive polarity can be induced at the detection electrode 32 by scanning the segment electrode X with a segment electrode scanning signal x having positive scanning pulses to thereby allow the polarity of the regular detection signal and the polarity of the error detection signal to be opposite to each other. Consequently, the pulse based on the error detection signal can be removed out of the binary signal also in the present case by making the slice voltage of the comparators 801 and 811 have the same polarity as that of the regular detection signal to thereby allow the regular detection signal to be separated easily.

Although the above description is based on the x-coordinate detection period in the display-integrated type tablet device of FIG. 20 having the duty type LCD panel 1, the same effect can be obtained in the y-coordinate detection period and in the display-integrated type tablet device of FIG. 21 having the active matrix type LCD panel 21.

Figure 25C:
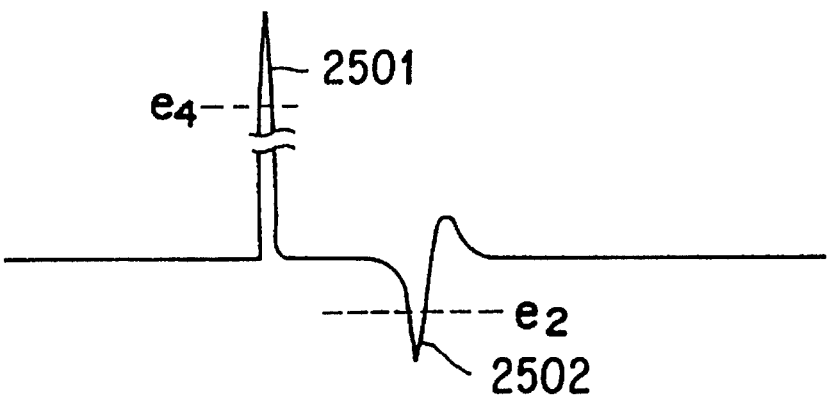
Figure 25D:

In the above description, an induction voltage signal as shown in FIG. 23C or FIG. 25C induced at the detection electrode 32 of the detection pen 8 is immediately binarized by the slice voltage "$e_3$" or the slice voltage "$e_2$" via the comparators 801 and 811. However, practically the signal is binarized after being amplified in several amplification stages.

Figure 25E:
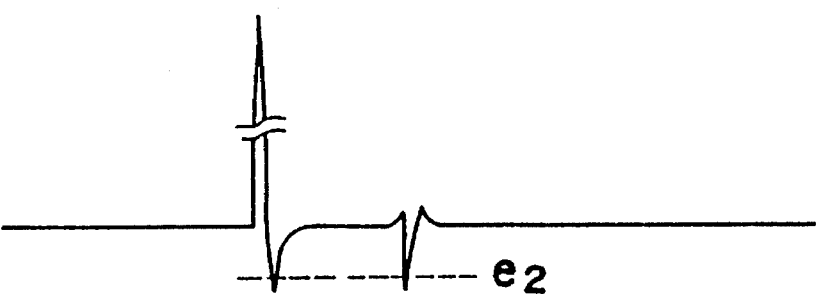
Figure 25F:

In the present case, an induction voltage signal including an error detection signal 2501 as shown in FIG. 25C is differentiated by a differentiation circuit (not shown) included in the amplifier circuit 9 to have a waveform as shown in FIG. 25E when the induction voltage signal from the detection electrode 32 is binarized after being amplified as described above. In other words, the error detection signal which has had the positive polarity comes to partially have the negative polarity as a result of differentiation, and the level in the negative polarity possibly exceeds the slice voltage "$e_2$". In such a case, a pulse based on the error detection signal exists other than the pulse based on the regular detection signal 2502 in the resulting binary signal as shown in FIG. 25F to make it impossible to separate the regular detection signal as it is.

In order to avoid the above-mentioned phenomenon, the following measure is taken. In detail, the amplifier circuit 9 is made to have a construction for amplifying the signal component in the region of only one polarity of the input signal with respect to the reference voltage. In the case of the induction voltage signal as shown in FIG. 25C, the signal component in the negative region where only the regular detection signal exists with respect to the reference voltage is only amplified. The above-mentioned arrangement can delete the influence of the above-mentioned phenomenon that the error detection signal is differentiated to partially have the negative polarity.

Otherwise, the signal component in the region where the error detection signal exists may be removed by a diode and so on in an early stage in amplifying the induction voltage signal from the detection electrode 32.

As described above, the polarity of the error detection signal attributed to the frictional electricity induced at the detection electrode 32 depends on the combination of the material of the protection panel 31 and the tip end dielectric material 33. Furthermore, the level of the error detection signal is extremely high, and in the x-coordinate detection period, the level reaches 40 to 100 times as high as the level of, for example, the regular detection signal based on the scanning pulse of the segment electrode scanning signal x.

In the above regard, a voltage "$e_4$" such that the level of the regular detection signal cannot reach and the level of the error detection signal based on the frictional electricity can reach is set up in another embodiment. Then by detecting the error detection signal based on the frictional electricity by means of a comparator having a reference voltage of "$e_4$" in the induction voltage signal from the detection electrode 32 to cancel the coordinate value detected in the relevant x-coordinate detection period or the y-coordinate detection period, or by removing the detection signal existing in the x-coordinate detection period or the y-coordinate detection period, the influence of the error detection signal attributed to the frictional electricity is easily removed.

In the aforementioned display-integrated type tablet device of FIG. 20 employing the duty type LCD panel 1, image display and y-coordinate detection can be simultaneously executed. In such a case, common electrode drive signals a through z formed by superimposing a slit-shaped scanning pulse for coordinate detection on a middle portion of the drive pulse for image display having, for example, the positive polarity are sequentially applied to the common electrode Y in a manner as shown in FIGS. 26A–D. Then the induction voltage signal from the detection electrode 32 of the detection pen 8 in a period when the level of the selection signal is at "H" level as shown in FIG. 26B is taken out by means of an analog switch or the like to detect the y-coordinate at the tip end of the detection pen 8 at the point of the slit (scanning pulse) of the drive pulse.

In the above case, since the scanning pulse is composed of a slit portion having the negative polarity with respect to the maximum voltage value of the drive pulse of the common electrode drive signals a through z, the common electrode Y is substantially scanned by scanning pulses in negative polarity. Therefore, in the above case, it is required for the tip end dielectric material 33 of the detection pen 8 and the protection panel 31 to be made of a material such that the friction surface of the tip end dielectric material 33 is charged with negative electric charges.

The aforementioned embodiments are each described on a display-integrated type tablet device in which the segment electrode X and the common electrode Y of the duty type LCD panel 1 or the gate bus line electrode G and the source bus line electrode S of the active matrix type LCD panel 21 are used commonly as the electrodes of the electrostatic induction tablet. However, the above-mentioned arrangement is not limitative in the present invention. For example, the present invention can be applied, for example, to every display-integrated type tablet device in which an electrode covered with a dielectric material is used as an electrode of the display panel, and the electrode of the display panel is electrostatically coupled with the detection electrode of the detection pen.

Furthermore, the TFT system active matrix is taken as an example of the active matrix for use in the LCD panel 21 in each of the aforementioned embodiments. However, the active matrix for use in the present invention is not limited to the above-mentioned active matrix and may be a diode type active matrix, a MIM (Metal-Insulator-Metal) type active matrix, a varistor type active matrix, or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, the display-integrated type tablet device comprising:

count means which counts a total number of times when the output signal output from the detection pen in the coordinate detection period exceeds a threshold level; and error detection determination means which compares a count number obtained by the count means in one coordinate detection period with the number of times of scanning the electrodes in the one coordinate detection period by means of the detection control circuit, and determines that, when the count number is greater than the number of times of scanning, error detection coordinates are included in coordinates on the display panel detected by the coordinate detection circuit in the coordinate detection period.

2. A display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, wherein the detection control circuit is constructed so as to provide a non-scanning period when no electrode is scanned in the coordinate detection period, and there is further comprised error detection determination means which observes a state of the output signal output from the detection pen in the non-scanning period, and determines that, when the state of the output signal exhibits deviation of the signal from a normal state where no external noise exists, error detection coordinates are included in coordinates on the display panel detected by the coordinate detection circuit in the coordinate detection period including the non-scanning period.

3. A display-integrated type tablet device including a display panel having first electrodes arranged in parallel in one direction and second electrodes arranged in parallel in another direction perpendicular to the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, the display-integrated type tablet device comprising:

binarization means which binarizes the output signal from the detection pen by different slice levels of a first slice level and a second slice level higher than the first slice level, and transmits a binary signal binarized by the first slice level to the coordinate detection circuit; and error detection determination means which observes a binary signal binarized by the second slice level by the binarization means, and determines that, when the level of the output signal exceeds the second slice level, coordinates on the display panel detected by the coordinate detection circuit at a point of time in the closest proximity to the point of time when the level of the output signal exceeds the second slice level are error detection coordinates.

4. A display-integrated type tablet device including a display panel having first electrodes arranged in parallel in one direction and second electrodes arranged in parallel in another direction different from the one direction, a detection pen having at a tip end a detection electrode electrostatically coupled with the first electrodes and the second electrodes, a first drive circuit for driving the first electrodes, a second drive circuit for driving the second electrodes, a display control circuit for displaying an image on the display panel by controlling the first drive circuit and the second drive circuit in an image display period, a detection control circuit for controlling the first drive circuit and the second drive circuit in a coordinate detection period so as to apply a scanning voltage to the first electrodes and the second electrodes to sequentially scan the first and second electrodes, and a coordinate detection circuit for detecting coordinates at a point pointed by the tip end of the detection pen according to a timing of generation of an output signal from the detection pen and a timing of scanning the first electrodes or the second electrodes, wherein the detection electrode of the detection pen is covered with a tip end member made of a dielectric material for protecting the detection electrode and a protection surface of the display panel, the coordinate detection circuit is constructed so as to detect the coordinates using only one polarity of the output signal from the detection pen with respect to a reference voltage, and a combination of material of the tip end member of the detection pen and material of the protection surface of the display panel is a combination such that a polarity of frictional electricity at the tip end of the detection pen is the same one polarity as the polarity of the output signal used by the coordinate detection circuit.

5. A display-integrated type tablet device as claimed in claim 4, wherein the first drive circuit and the second drive circuit apply a scanning voltage to each of the electrodes in sequentially scanning the first electrodes and the second electrodes in the coordinate detection period, the scanning voltage being such that its polarity with respect to the reference voltage is the same one polarity as the polarity of the frictional electricity at the tip end member of the detection pen.

* * * * *